United States Patent
Takahashi et al.

(10) Patent No.: US 7,525,896 B2
(45) Date of Patent: Apr. 28, 2009

(54) OPTICAL HEAD AND OPTICAL DISK APPARATUS

(75) Inventors: Yuuichi Takahashi, Kitakatsuragi-gun (JP); Kazuo Momoo, Hirakata (JP)

(73) Assignee: Panasonic Corporation, Kadoma (JP)

( * ) Notice: Subject to any disclaimer, the term of this patent is extended or adjusted under 35 U.S.C. 154(b) by 520 days.

(21) Appl. No.: 10/554,533

(22) PCT Filed: Apr. 26, 2004

(86) PCT No.: PCT/JP2004/006022

§ 371 (c)(1),
(2), (4) Date: Oct. 25, 2005

(87) PCT Pub. No.: WO2004/097820

PCT Pub. Date: Nov. 11, 2004

(65) Prior Publication Data
US 2006/0215504 A1     Sep. 28, 2006

(30) Foreign Application Priority Data
Apr. 28, 2003 (JP) .............................. 2003-124057

(51) Int. Cl.
*G11B 7/00* (2006.01)
(52) U.S. Cl. ................. 369/112.01; 369/94; 369/112.23
(58) Field of Classification Search ............ 369/112.01, 369/112.03, 112.05, 112.23, 94
See application file for complete search history.

(56) References Cited

U.S. PATENT DOCUMENTS

| | | | |
|---|---|---|---|
| 6,084,843 A | 7/2000 | Abe et al. | |
| 6,195,315 B1 | 2/2001 | Takahashi et al. | |
| 6,480,456 B1 | 11/2002 | Kawamura et al. | |
| 6,747,812 B2 * | 6/2004 | Ota et al. | 359/719 |
| 6,836,452 B2 | 12/2004 | Matsuda | |
| 7,075,880 B2 * | 7/2006 | Honda et al. | 369/112.08 |

(Continued)

FOREIGN PATENT DOCUMENTS

JP        10-261241        9/1998

(Continued)

OTHER PUBLICATIONS

English Machine Translation of JP11-149657.*

(Continued)

*Primary Examiner*—Thang V Tran
*Assistant Examiner*—Lixi Chow
(74) *Attorney, Agent, or Firm*—Renner, Otto, Boisselle & Sklar, LLP

(57) ABSTRACT

An optical head comprises first and second light sources which are arranged next to each other and emit lights of different wavelengths and an optical device which is arranged between the first and second light sources and a conversing lens for reducing the spherical aberration caused by combination of the conversing lens and at least one of first and second optical recording media which correspond to at least one of the lights of first and second wavelengths. The optical axis of the optical device is shifted with respect to the optical axis of the conversing lens in order to reduce the coma aberration that is caused since at least one of optical axes of the lights of first and second wavelengths does not coincide with the optical axis of the conversing lens.

14 Claims, 17 Drawing Sheets

U.S. PATENT DOCUMENTS 7,164,645 B2 * 1/2007 Kimura ................. 369/112.01
2002/0051421 A1 5/2002 Takeda

FOREIGN PATENT DOCUMENTS

| JP | 11-149657 | 6/1999 |
|---|---|---|
| JP | 2001-184698 | 7/2001 |
| JP | 2002-237083 | 8/2002 |
| JP | 2003-317302 | 11/2003 |
| WO | 01/93254 | 12/2001 |

OTHER PUBLICATIONS

International Search Report for corresponding PCT/JP2004/006022, mailed, Aug. 31, 2004.
Supplementary European Search Report issued on Aug. 13, 2008 for corresponding European Patent Application No. 04729539.9.

* cited by examiner

UPPER PLAN VIEW

SIDE VIEW r1=0.334mm  r5=1.205mm
r2=0.535mm  r6=1.269mm
r3=0.598mm  r7=1.316mm
r4=0.801mm  r8=1.365mm

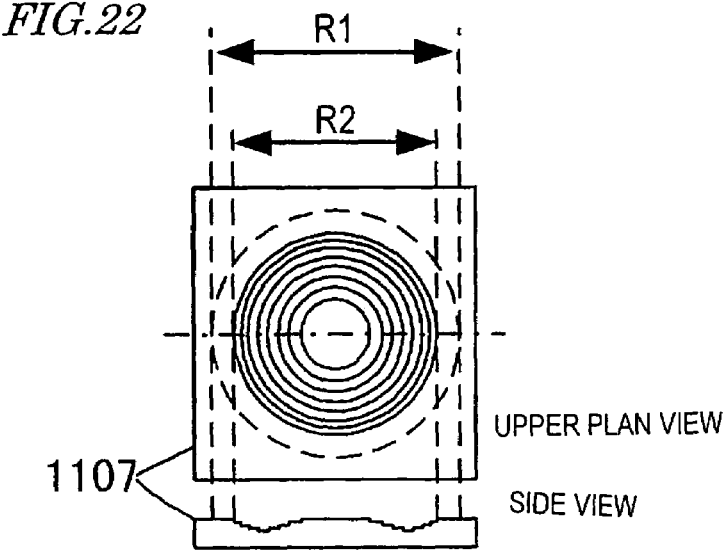
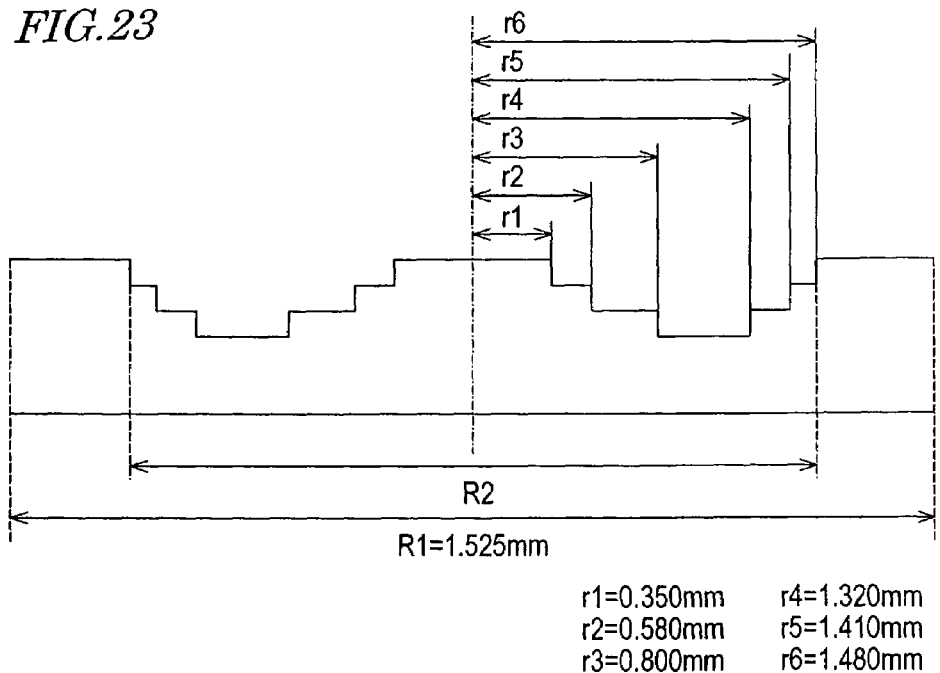

OPTICAL HEAD AND OPTICAL DISK APPARATUS

TECHNICAL FIELD

The present invention relates to an optical head for optically performing recording or reproduction of information, and an optical disk apparatus incorporating an optical head.

BACKGROUND ART

In recent years, it has become commonplace to use optical recording media as recording media, and a plurality of types of optical recording media of different recording capacities and standards are widely prevalent. For optical recording media of different standards, light sources of different wavelengths are used for recording or reproduction. Therefore, an optical disk apparatus which supports a plurality of types of optical recording media includes a plurality of light sources to be used for recording or reproduction.

FIG. 27 schematically shows the configuration of an optical system in an optical head of a conventional optical disk apparatus. This optical disk apparatus is disclosed in, for example, Japanese Laid-Open Patent Publication No. 2001-184698. The optical disk apparatus shown in FIG. 27 has a light source device 1603, which includes a light source 1601 for emitting light of a wavelength λ1 and a light source 1602 for emitting light of a wavelength λ2 (λ1<λ2) that are placed in a single package.

When performing recording or reproduction for a first optical recording medium 1609, the light source 1601 is used. Light 1604 which is emitted from the light source 1601 is led through a collimating lens 1605, reflected by a mirror 1606, and converged by a converging lens 1608 onto the first optical recording medium 1609. Light which is reflected from the first optical recording medium 1609 follows an opposite optical path to reach the mirror 1606, and a portion thereof is transmitted through the mirror 1606. Further passing through a detection lens 1610, the light enters a photodetector 1611. The light entering the photodetector 1611 is detected by a photosensitive device within the photodetector 1611, whereby control signals for focus control and tracking control and a reproduction signal containing information which has been recorded on the first optical recording medium 1609 are generated.

When performing recording or reproduction for a second optical recording medium 1613, the light source 1602 is used. Light 1612 emitted from the light source 1602 is led through the collimating lens 1605, reflected by the mirror 1606, and converged by the converging lens 1608 onto the second optical recording medium 1613, which has a different substrate thickness from that of the first optical recording medium 1609. Light which is reflected from the information optical recording medium 1613 follows an opposite optical path to reach the mirror 1606, and a portion thereof is transmitted through the mirror 1606. Further passing through the detection lens 1610, the light enters the photodetector 1611. As in the case of the first optical recording medium 1609, the light entering the photodetector 1611 is detected by the photosensitive device within the photodetector 1611, whereby control signals for focus control and tracking control and a reproduction signal containing information which has been recorded on the first optical recording medium 1609 are generated.

As described above, in the optical disk apparatus of FIG. 27, the light source 1601 and the light source 1602 are accommodated in a single package. This is so that, by disposing the light sources of different wavelengths in substantially the same place, rays of light emitted from the two light sources share the same optical path, thus simplifying the structure of the optical system. As a result, the outer figure of the entire optical head including the optical system can be reduced, and the costs associated with the optical head can be reduced.

However, the light source 1601 and the light source 1602 disposed in the light source device 1603 cannot be positioned in exactly the same place. Therefore, as schematically shown in FIG. 27, the optical axis of the light 1604 emitted from the light source 1601 and the optical axis of the light 1612 emitted from the light source 1602 do not coincide with each other. For example, if the optical axis of the light 1604 emitted from the light source 1601 is made to coincide with the optical axis of the converging lens 1608, then the optical axis of the light 1612 emitted from the light source 1602 will not coincide with the optical axis of the converging lens 1608, but will be shifted therefrom.

As a result, when performing recording or reproduction for the second optical recording medium 1613 by using the light source 1602, aberration (chiefly coma) occurs in the beam spot which is converged on the second optical recording medium 1613. Thus, there occurs a problem in that recording or reproduction of information cannot be properly performed, and the recording or reproduction performance deteriorates.

In particular, when performing recording for an optical recording medium, there may occur a problem in that recording marks of an appropriate shape cannot be formed on the tracks because of aberration occurring in the beam spot which is converged on the optical recording medium.

As optical recording media increase in recording density, the recording marks will have smaller shapes, and the track intervals will become narrower. Therefore, in the case of optical recording media of high recording density, such problems may become even more serious.

DISCLOSURE OF INVENTION

In view of the aforementioned problems, the present invention aims to realize, in the context of an optical head having a plurality of closely-disposed light sources, an optical head and optical disk apparatus which reduces aberration with a simple configuration, and attains an excellent recording performance or reproduction performance.

An optical head according to the present invention is for use in an optical disk apparatus which performs recording and/or reproduction of information for first and second optical recording media by using, respectively, light of a first wavelength and light of a second wavelength which is different from the first wavelength. The optical head comprises: a first light source for emitting light of the first wavelength; a second light source for emitting light of the second wavelength which is different from the first wavelength, the second light source being disposed adjacent to the first light source; a converging lens for converging the light emitted from the first and second light sources toward the first and second optical recording media; and an optical device disposed between: the first and second light sources; and the converging lens, the optical device reducing a spherical aberration which occurs due to a combination of: at least one of the light of the first wavelength and light of the second wavelength; at least corresponding one of the first and second optical recording media; and the converging lens, wherein an optical axis of the optical device is shifted with respect to an optical axis of the converging lens so that the optical device reduces a coma which occurs due to an optical axis of at least one of the light of the first wavelength and light of the second wavelength not coinciding with the optical axis of the converging lens.

In a preferred embodiment, the converging lens is structured so as to optimize the optimum spherical aberration with respect to the first optical recording medium; and the optical device reduces the spherical aberration which occurs due to the converging lens and the second optical recording medium only with respect to the light of the second wavelength, by changing a transmitted wave front of the light of the second wavelength and not changing a transmitted wave front of the light of the first wavelength.

In a preferred embodiment, the first and second optical recording media include a recording layer on which to form recording marks, and a substrate provided on a surface of the recording layer; the converging lens is structured to optimize the spherical aberration with respect to an optical recording medium whose substrate has a thickness t (where t satisfies the relationship $t1<t<t2$), wherein $t1$ and $t2$ are thicknesses of the substrates of the first and second optical recording media; and the optical device reduces the spherical aberration which occurs due to the converging lens and the substrates of the first and second optical recording media with respect to the light of the first wavelength and light of the second wavelength by changing transmitted wave fronts of the light of the first wavelength and light of the second wavelength.

In a preferred embodiment, the optical device includes a first aberration correction section provided in a region through which only the light of the first wavelength is transmitted and a second aberration correction section provided in a region through which the light of the first wavelength and the light of the second wavelength are transmitted; the optical axis of the optical device coincides with an optical axis of the second aberration correction section; and an optical axis of the first aberration correction section coincides with the optical axis of the converging lens.

In a preferred embodiment, the converging lens is structured so as to converge the light of the first wavelength with a numerical aperture NA2 in a region within a circle of a diameter R2 centered around the optical axis thereof, and converge the light of the first wavelength with a numerical aperture NA1 (where NA1>NA2) in a region within a circle of a diameter R1 (where R2<R1) centered around the optical axis; the region of the converging lens within the circle of the diameter R2 is structured so as to optimize the spherical aberration with respect to the optical recording medium whose substrate has the thickness t (where t satisfies the relationship $t1<t<t2$); and a region of the converging lens interposed between the circle of the diameter R1 and the circle of the diameter R2 is structured so as to optimize the spherical aberration with respect to the first optical recording medium.

In a preferred embodiment, the optical axis of the optical device is shifted with respect to the optical axis of the converging lens, toward the optical axis of the light emitted from the second light source.

In a preferred embodiment, the relationship $d1<d2$ is satisfied, where $d1$ and $d2$ are, respectively, a distance between the optical axis of the converging lens and the optical axis of the light emitted from the first light source and a distance between the optical axis of the converging lens and the optical axis of the light emitted from the second light source.

In a preferred embodiment, the optical device has a rotation symmetrical structure with respect to the optical axis.

In a preferred embodiment, the optical device includes a plurality of annular steps disposed in a concentric arrangement around the optical axis.

In a preferred embodiment, the first aberration correction section and the second aberration correction section of the optical device each have a rotation symmetrical structure with respect to the optical axis thereof.

In a preferred embodiment, the first aberration correction section and the second aberration correction section of the optical device each include a plurality of annular steps disposed in a concentric arrangement around the corresponding optical axis.

In a preferred embodiment, the first and second light sources are accommodated in a single package.

In a preferred embodiment, a photodetector for detecting reflected light which occurs due to the light emitted from the first and second light sources being reflected at the first and second optical recording media is further comprised, wherein the detectors are disposed within the package.

In a preferred embodiment, the converging lens and the optical device are integrally formed.

An optical disk apparatus according to the present invention comprises any of the optical heads defined above.

A beam spot formation method according to the present invention is a beam spot formation method for forming first and second light beam spots by converging light respectively emitted from adjoining first and second light sources with a single converging lens, wherein an optical device for correcting a spherical aberration which occurs in at least one of the first and second light beam spots due to the converging lens and the first and second optical recording media is disposed between: the first and second light beam spots; and the converging lens, and an optical axis of the optical device is shifted with respect to an optical axis of the converging lens so as to reduce a coma which occurs due to optical axes of the first and second light sources not coinciding with the optical axis of the converging lens.

BRIEF DESCRIPTION OF DRAWINGS

FIG. 22 schematically shows the structure of an optical device to be used in the optical head shown in FIG. 19.

FIG. 23 shows an enlarged view of a cross section of a main portion of the optical device shown in FIG. 22.

BEST MODE FOR CARRYING OUT THE INVENTION

In an optical head having a plurality of closely-disposed light sources, a light beam which is emitted from each light source is converged by a single shared converging lens toward an optical recording medium. The refractive index of a converging lens differs depending on wavelength, and the focal point of convergence also differs due to differences in thickness of the substrate which is provided on the surface of a recording layer of an optical recording medium and differences in numerical aperture. Therefore, in the case where a converging lens is designed so that the spherical aberration will be zero or negligibly small with respect to light of a certain wavelength and with respect to an optical recording medium of a certain substrate thickness, some spherical aberration will occur in a beam spot to be formed on an optical recording medium with respect to light of another wavelength and with respect to an optical recording medium having another substrate thickness.

Therefore, in an optical head which employs a single converging lens against a plurality of light sources and optical recording media of a plurality of substrate thicknesses, an optical device for reducing spherical aberration is incorporated. Since spherical aberration would occur in a rotation symmetrical manner with respect to the optical axis of the converging lens, the optical device is to be disposed in such a manner that its optical axis coincides with the optical axis of the converging lens.

The inventors of the present invention have found that, by disposing this optical device for correcting spherical aberration in such a manner as to be shifted from the optical axis of the optical lens, coma which occurs with the use of a plurality of light sources can be reduced. In other words, according to the present invention, spherical aberration and coma are simultaneously reduced by an optical device for correcting spherical aberration, without employing an aberration correction device for reducing coma. Therefore, in the optical head of the present invention, coma of the light emitted from a plurality of light sources is appropriately reduced, in spite of its simple structure. Hereinafter, embodiments of the present invention will be described with reference to the figures.

First Embodiment

Figure 1:
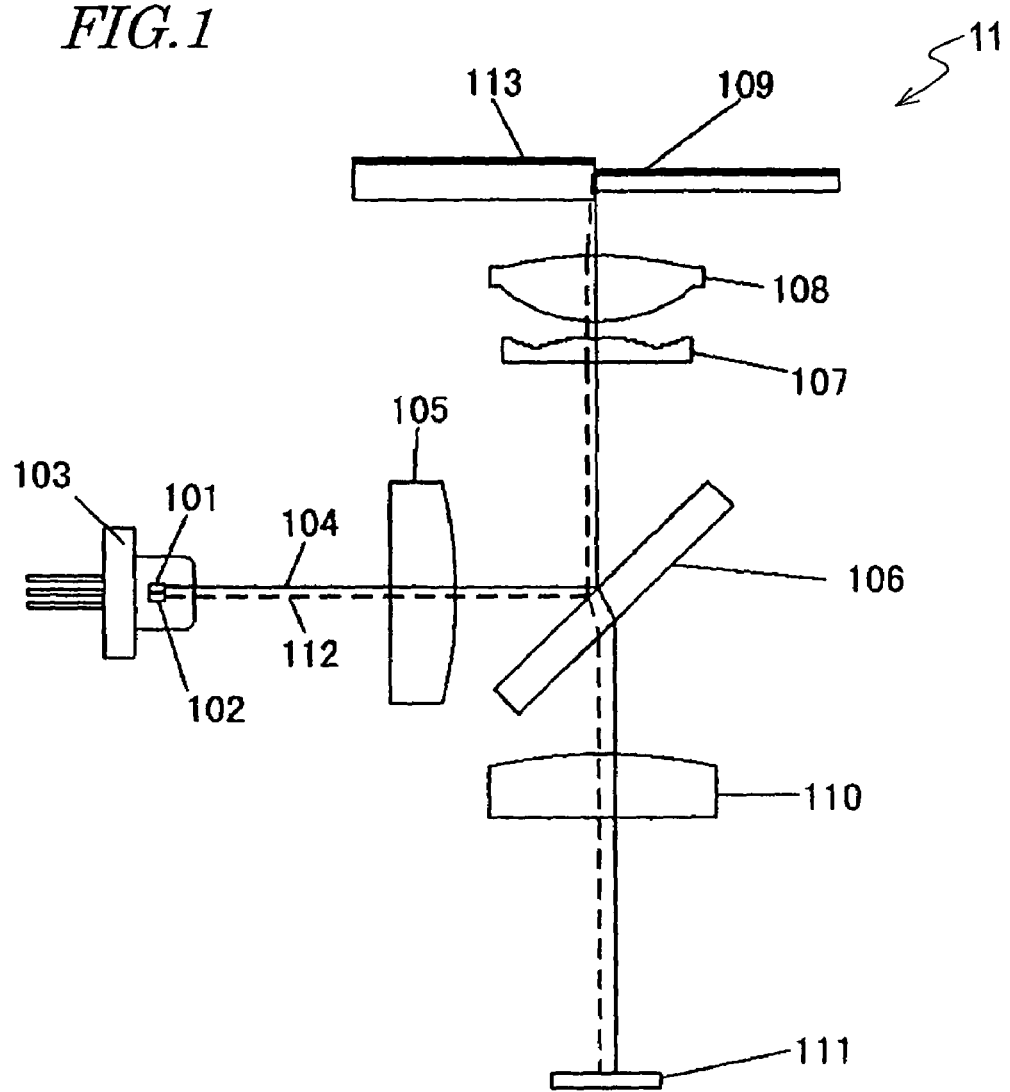
FIG. 1 is a diagram schematically showing the configuration of an optical head according to a first embodiment of the present invention.

FIG. 1 is diagram showing a first embodiment of an optical head according to the present invention. The optical head 11 shown in FIG. 1 is used for an optical disk apparatus which performs recording and/or reproduction of information for a first optical recording medium 109 and a second optical recording medium 113. As shown in FIG. 1, the optical head 11 comprises a first light source 101, a second light source 102, an optical device 107, and a converging lens 108. The first light source 101 and the second light source 102 emit light of a first wavelength $\lambda 1$ and a second wavelength $\lambda 2$, respectively. The first wavelength $\lambda 1$ and the second wavelength $\lambda 2$ are different, such that the relationship $\lambda 1 < \lambda 2$ is satisfied. As shown in FIG. 1, the first light source 101 and the second light source 102 are closely disposed so as to be accommodated in a single package, thus constituting the light source device 103.

The first wavelength $\lambda 1$ and the second wavelength $\lambda 2$ are about 660 nm and about 790 nm, for example. In this case, the first optical recording medium 109 for which recording/reproduction is to be performed with the first light source 101 is a DVD, whereas the second optical recording medium 113 for which recording/reproduction is to be performed with the second light source 102 is a CD.

Moreover, between the first optical recording medium 109 and the second optical recording medium 113, the thickness of the substrate to be provided on the surface of a recording layer is different. In the case where the first optical recording medium 109 is a DVD and the second optical recording medium 113 is a CD, the substrate thicknesses are 0.6 mm and 1.2 mm, respectively.

The inter-center distance between the first light source 101 and the second light source 102 in the light source device 103 is preferably in the range from 50 µm to 500 µm. If the inter-center distance is greater than 500 µm, the interspace between the optical axes of the light emitted from the two light sources will be too large, thus making it difficult to share an optical path. Since each light source has a predetermined structure as a laser resonator, it would be physically difficult to dispose two light sources at an inter-center distance less than 50 µm. The inter-center distance between the first light source 101 and the second light source 102 is preferably 110 µm.

The converging lens 108 converges light which is emitted from the first light source 101 and the second light source 102 toward the first optical recording medium 109 and the second optical recording medium 113, and forms recording marks on the first optical recording medium 109 and the second optical recording medium 113, or forms a beam spot in a predetermined convergence state on a recording layer having pits formed therein. The portion of the converging lens 108 that functions as a lens has a rotation symmetrical shape with respect to an axis which is the optical axis.

In the case of performing recording and/or reproduction for the first optical recording medium 109, the converging lens 108 converges light of the first wavelength with an numerical aperture NA1. Similarly, in the case of performing recording and/or reproduction for the second optical recording medium 109, it converges light of the second wavelength with a numerical aperture NA2 which satisfies NA1>NA2. In the case where the first optical recording medium 109 is a DVD and the second optical recording medium 113 is a CD, NA1 and NA2 are 0.63 and 0.50, for example. Since NA1>NA2, the light 104 emitted from the first light source 101 has a larger beam radius than the beam radius of the light 112 emitted from the second light source 102.

On an optical path of the light emitted from the first light source 101 and the second light source 102, the optical device 107 is interposed between the converging lens 108 and the first light source 101 and the second light source 102, and reduces the spherical aberration which occurs due to a combination of at least one of light of first and second wavelengths, the converging lens 108, and the first optical recording medium 109 and the second optical recording medium 113.

In the present embodiment, as will be specifically described below, the converging lens 108 is designed so that the spherical aberration of a beam spot which is formed on the recording layer of the first optical recording medium becomes optimum with respect to the light of the first wavelength and the first optical recording medium 109. Moreover, the optical device 107 reduces the spherical aberration which occurs due to a combination of the light of the second wavelength, the converging lens 108, and the second optical recording medium 113.

Otherwise, the optical head 11 comprises a collimating lens 105, a mirror 106, a detection lens 110, and a photodetector 111.

The light 104 which is emitted from the first light source 101 of the light source device 103 is converged by the collimating lens 105 so as to become parallel light, and is reflected by the mirror 106 toward the converging lens 108. The light 104 is transmitted through the optical device 107, and is converged by the converging lens 108 toward the first optical recording medium 109, so as to take a predetermined convergence state on the recording layer of the first optical recording medium 109. The converged light 104 is reflected at the recording layer, and follows an opposite optical path to reach the mirror 106. A portion of the light having reached the mirror 106 is transmitted through the mirror 106, has its convergence state adjusted by the detection lens 110, and enters the photodetector 111.

The photodetector 111 detects the incoming light with a photosensitive device which is divided into a plurality of regions, and converts it to a plurality of electrical signals. By using these electrical signals, control signals for focus control and tracking control and a reproduction signal containing information which is recorded on the first optical recording medium 109 are generated. The generation of the control signals and the reproduction signal can be performed with a known configuration.

The light 112 which is emitted from the second light source 102 of the light source device 103 similarly propagates along the optical path including the collimating lens 105, the mirror 106, and the optical device 107, and is converged by the converging lens 108 toward the second optical recording medium 113 so as to take a predetermined convergence state on the recording layer of the second optical recording medium 113. The converged light 112 is reflected at the recording layer, and follows an opposite optical path to reach the mirror 106. A portion of the light 112 is transmitted through the mirror 106 and the detection lens 110, and enters the photodetector 111.

In the photodetector 111, the incoming light is converted into electrical signals, and control signals for focus control and tracking control and a reproduction signal containing information which is recorded on the second optical recording medium 113 are generated.

Next, the reduction of spherical aberration and coma in the optical head 11 will be specifically described.

Figure 2A:
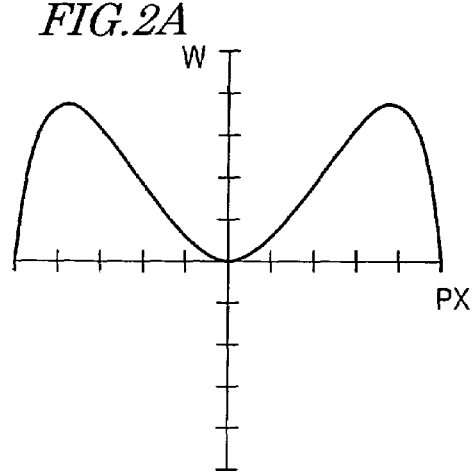
FIG. 2A and FIG. 2B each show a profile of spherical aberration occurring in a light beam spot in an optical recording medium.
Figure 2B:
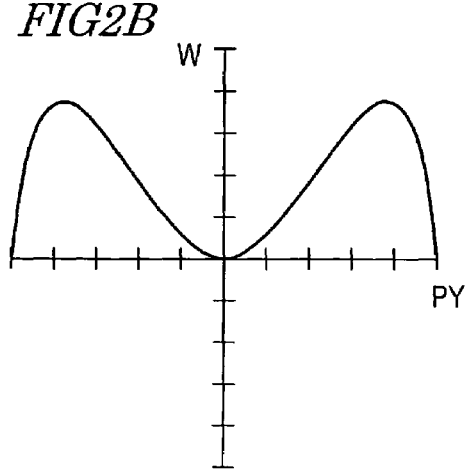

As described earlier, the converging lens 108 is designed so that the spherical aberration of a beam spot which is formed on the recording layer of the first optical recording medium 109 becomes optimum, i.e., substantially zero, with respect to the light of the first wavelength and the first optical recording medium 109. Since the light of the first wavelength and the light of the second wavelength have different wavelengths, and since the thickness of the substrate of the second optical recording medium 113 is different from the thickness of the substrate of the first optical recording medium 109, spherical aberration occurs when a beam spot is formed on the recording layer of the second optical recording medium 113 with the light of the second wavelength. FIG. 2A and FIG. 2B schematically show profiles of spherical aberration of a beam spot which is formed on the recording layer of the second optical recording medium 113 with the light of the second wavelength. In these figures, the horizontal axes PX and PY represent two perpendicular directions on a plane which is parallel to the recording layer, whereas the vertical axis W represents an equiphase wave surface of the wave front as normalized by wavelength. The vertical axis coincides with the optical axis of the converging lens 108. As shown in FIG. 2A and FIG. 2B, spherical aberration occurs in a rotation symmetrical manner, around the optical axis of the converging lens 108. Moreover, the spherical aberration becomes minimum on the optical axis and maximum at a predetermined distance from the optical axis.

Figure 3A:
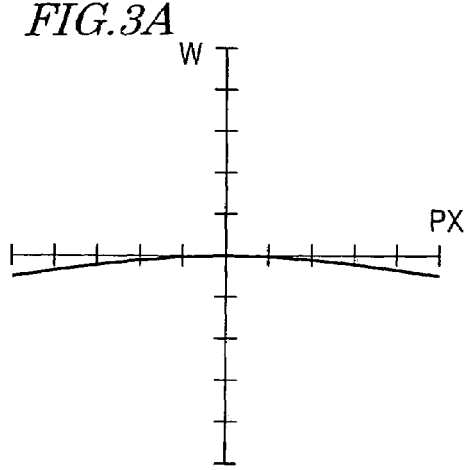
FIG. 3A and FIG. 3B each show a profile of coma which occurs due to shifting of a light source from the optical axis of a converging lens.
Figure 3B:
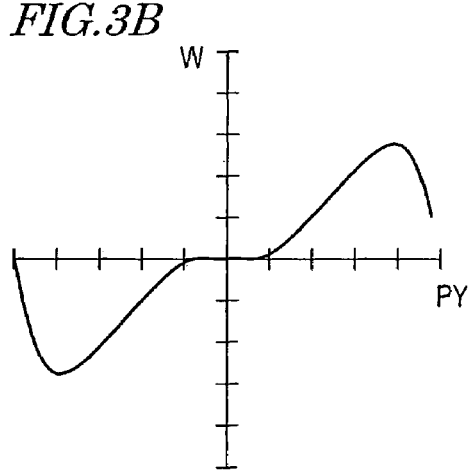

On the other hand, FIG. 3A and FIG. 3B show coma of a beam spot occurring in the case where the optical axis of the light source is shifted from the optical axis of the converging lens 108. Coma occurs if the optical axis of the light source is shifted from the optical axis of the converging lens 108 such that light obliquely enters the converging lens 108. Therefore, in the case where the optical axis of the converging lens 108 does not coincide with the optical axis of the light source, aberration occurs with respect to both light of the first wavelength and light of the second wavelength. Moreover, the coma is largest along a direction in which the optical axis of the light source is shifted from the optical axis of the converging lens 108, and is small along a direction perpendicular to the direction along which shifting is occurring. In FIG. 3A and FIG. 3B, the light source is shifted along the PY direction.

Figure 4:
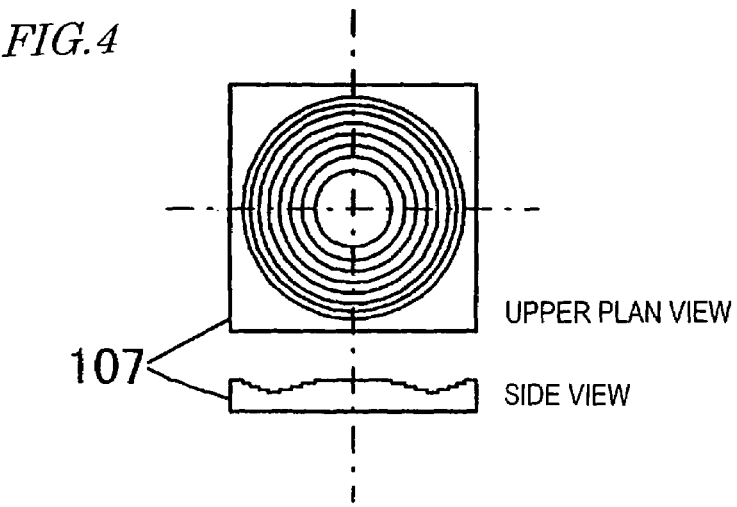
FIG. 4 schematically shows the structure of an optical device to be used in the optical head shown in FIG. 1.
Figure 5:
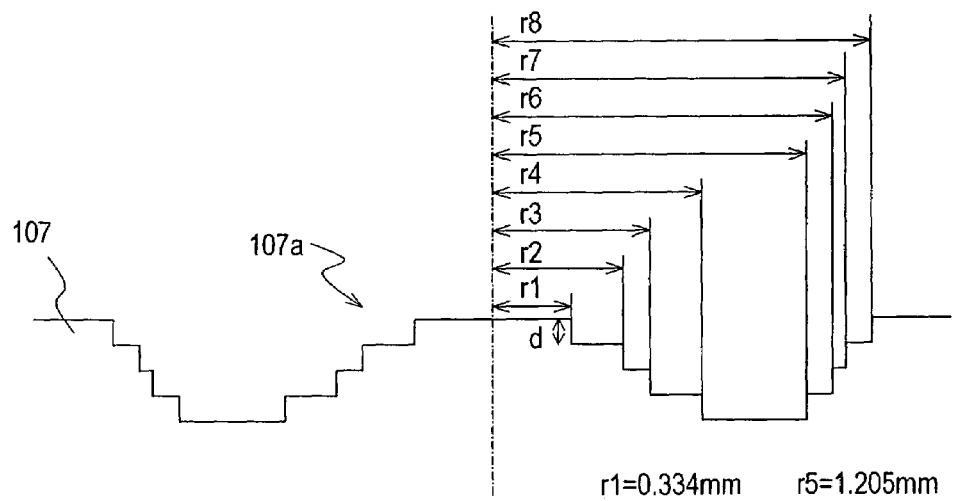
FIG. 5 shows an enlarged view of a cross section of a main portion of the optical device shown in FIG. 4.

With respect to light of the second wavelength, in order to correct the spherical aberration which occurs due to the converging lens 108 and the second optical recording medium 113, it suffices if an aberration that cancels the spherical aberration as shown in FIG. 2A and FIG. 2B exists in the light entering the converging lens 108. FIG. 4 schematically shows the structure of the optical device 107 for correcting spherical aberration. FIG. 5 shows the cross-sectional shape of a main portion of the optical device 107. As shown in FIG. 4, the optical device 107 has two parallel principal faces, and includes a plate structure which is transparent with respect to the first wavelength and the second wavelength. On one principal face of the plate structure, a plurality of annular steps disposed in a concentric arrangement are provided. The outermost ring has a diameter which is generally equal to the diameter of the light emitted from the second light source 102.

Figure 6:
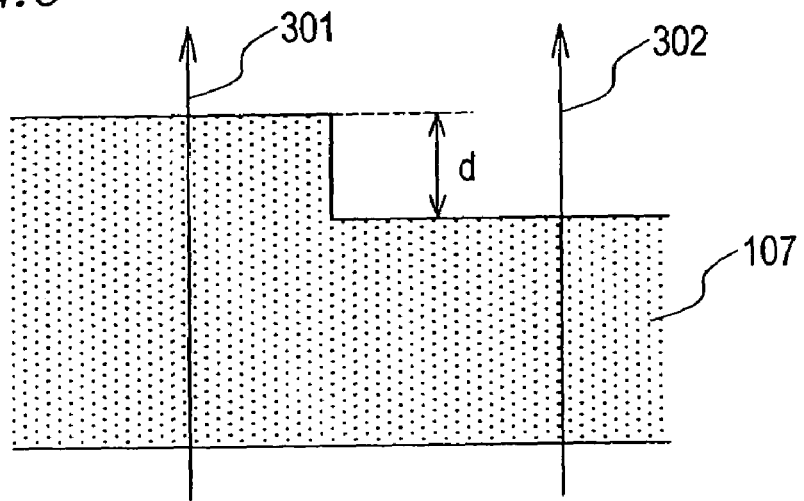
FIG. 6 shows a further enlarged view of a portion of the structure shown in FIG. 4.

The annular steps form annular terraces interposed between steps. The depth of each annular step is equally prescribed to be d. FIG. 6 is an enlarged cross-sectional view of a certain step portion. As shown in FIG. 6, the optical path difference between light 301 and 302 transmitted through two adjoining annular terraces is represented as $(n1-1)d$, where n1 is a refractive index of the optical device 107 with respect to the first wavelength $\lambda 1$. The optical path difference $(n1-1)d$ is prescribed so as to be an integer multiple of the first wavelength $\lambda 1$, i.e., so as to satisfy $d=N\lambda 1/(n1-1)$ (where N is an integer equal to or greater than one). Moreover, $d \neq N\lambda 2/(n2-1)$ (where N is every integer equal to or greater than one) is satisfied, where n2 is a refractive index of the optical device 107 with respect to the second wavelength $\lambda 2$.

The annular steps which are provided on the optical device 107 are prescribed so as to have a profile which will cause a phase difference that corrects the spherical aberration (FIG. 2A and FIG. 2B) occurring with respect to the second light source. For example, as shown in FIG. 5, four annular steps are provided so as to have decreasing thicknesses from the center of the optical device 107 toward the outside, and four annular steps are provided so as to have increasing thicknesses further toward the outside. As shown in FIG. 2A and FIG. 2B, the changes in spherical aberration are greater at the outer periphery portion, and therefore the interspace between steps of the optical device 107 becomes narrower at the outer periphery portion, as shown in FIG. 5. Note that the structure shown in FIG. 5 is an example in the case where: $\lambda 1=0.66$ μm; $\lambda 2=0.79$ μm; NA1=0.63; NA2=0.50; refractive index (of the optical device 107) $n1 \approx n2 \approx 1.51$; N=1; focal length of the converging lens is 2.8; and focal length of the collimating lens is 18.3. Such an optical device 107 can be produced by a known designing and production method for an optical device for correcting spherical aberration.

In the case where the light emitted from the first light source 101 is transmitted through the optical device 107, there exists no optical path difference because the steps of the optical device 107 satisfy the aforementioned relationship, and therefore the wave front of the light after transmission is not changed.

On the other hand, in the case where the light emitted from the second light source 102 is transmitted through the optical device 107, a phase difference occurs because of the annular steps, so that the wave front of the light after transmission is changed. The phase difference of the light 112 of the second wavelength $\lambda 2$ due to this changed wave front has a distribution that will correct the spherical aberration occurring for the converging lens 108 and the second optical recording medium 113.

Therefore, when the light emitted from the second light source 102 is allowed to be transmitted through the optical device 107 in such a manner that its optical axis coincides with the optical axis of the optical device 107 and the optical axis of the converging lens 108 and then converged by the converging lens 108, the beam spot which is formed on the recording layer of the second optical recording medium 113 will have substantially zero spherical aberration.

Figure 7:
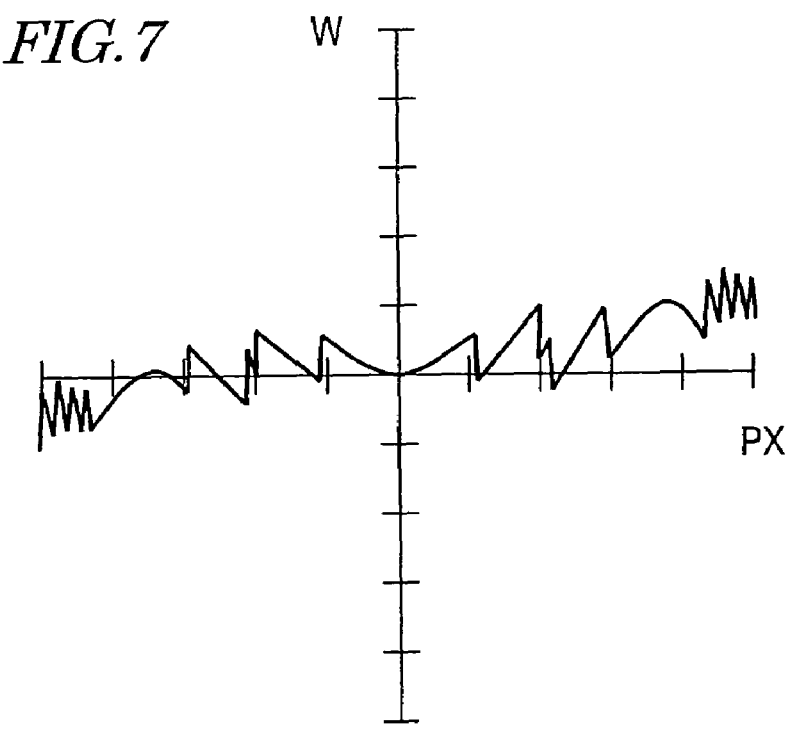
FIG. 7 shows a profile of coma occurring in the case where, in the optical head of FIG. 1, the optical axes of an optical device and a converging lens are made to coincide.

However, as described earlier, the first light source 101 and the second light source 102 disposed in the light source device 103 cannot be provided in the same place. FIG. 7 shows a distribution of coma which occurs due to the second light source 102 in the case where the optical axis of the first light source 101, the optical axis of the optical device 107, and the optical axis of the converging lens 108 are disposed so as to coincide with one another. The interspace between the first light source 101 and the second light source 102 is prescribed to be 110 μm. Since the second light source 102 is disposed at a predetermined distance from the first light source 101, the optical axis of the second light source 102 is shifted with respect to the optical axis of the optical device 107 and the optical axis of the converging lens 108. As a result, coma components occur as shown in FIG. 7. In the case where the optical device 107 is designed with the dimensions as shown in FIG. 5, there will be a coma of about $15 \times 10^{-3} \times \lambda 2$.

Figure 8:
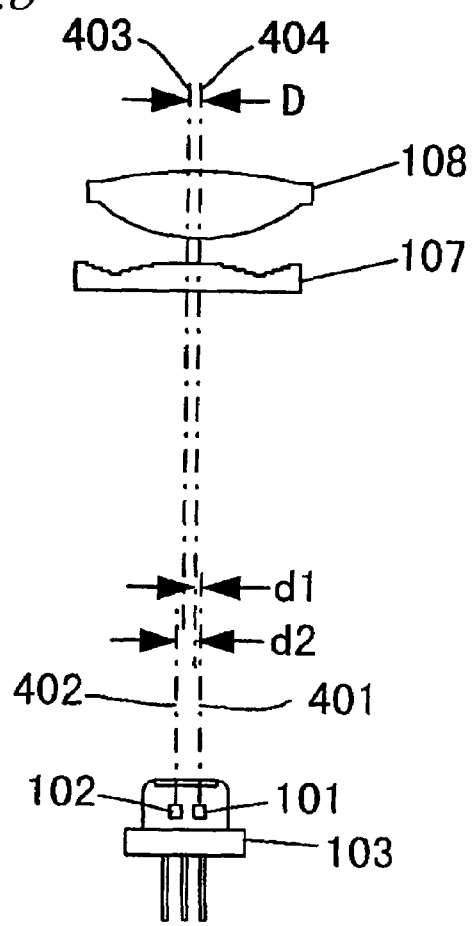
FIG. 8 is a diagram for explaining relative positioning of main constituent elements of the optical head of FIG. 1.

In accordance with the optical head of the present invention, in order to reduce this coma, the optical axis of the optical device 107 is shifted with respect to the optical axis of the converging lens 108. Specifically, as shown in FIG. 8, the light source device 103 is positioned with respect to the converging lens 108 so as to satisfy $d1<d2$, where d1 is the distance between the optical axis 404 of the converging lens 108 and the optical axis 401 of the first light source 101 and d2 is the distance between the optical axis 404 of the converging lens 108 and the optical axis 402 of the second light source 102. Moreover, the optical axis 403 of the optical convergence device 107 is shifted with respect to the optical axis 404 of the converging lens 108 by a distance D (where $D<d2$) toward the optical axis 402 of the second light source 102.

Based on the relative positioning of the converging lens 108, the optical device 107, the first light source 101, and the second light source 102, the values of the distances D, d1, and d2 are determined so that the phase difference (which occurs due to the optical device 107) with respect to the light emitted from the second light source 102 cancels or lessens the coma which occurs due to the second light source 102 and the spherical aberration which occurs due to the converging lens 108. Although FIG. 8 illustrates the converging lens 108 and the optical device 107 to be disposed in the direction of the light emitted from the light source device 103 for ease of understanding of the relationship between these optical axes, in practice, the direction of the light emitted from the light source device 103 is deflected by the mirror 106 as shown in FIG. 1. These distances can be determined through simulations using parameters which determine the optical characteristics of the converging lens 108, the optical device 107, the collimating lens 105, the first light source 101, and the second light source 102, for example.

When light of the first wavelength is emitted from the first light source 101, as described above, no phase difference occurs upon transmission through the optical device 107. Moreover, the converging lens 108 is optimized so as to minimize spherical aberration with respect to the light of the first wavelength. Therefore, spherical aberration is suppressed in the beam spot which is formed on the recording layer of the first optical recording medium 109 by the first light source 101.

Moreover, since the light source device 103 is disposed so as to satisfy the relationship $d1<d2$, coma occurring due to the first light source 101 is also suppressed.

On the other hand, when light of the second wavelength is emitted from the second light source 102, upon transmission through the optical device 107, the transmitted wave front changes so as to cause a phase difference which will correct or compensate the spherical aberration occurring at the converging lens 108. By appropriately shifting the optical axis of the optical device 107 from the converging lens 108, it becomes possible to allow the light which has acquired a phase difference to enter the converging lens 108 in such a manner as to reduce coma. As a result, both spherical aberration and coma can be suppressed in the beam spot which is formed on the recording layer of the second optical recording medium 113.

Figure 9:
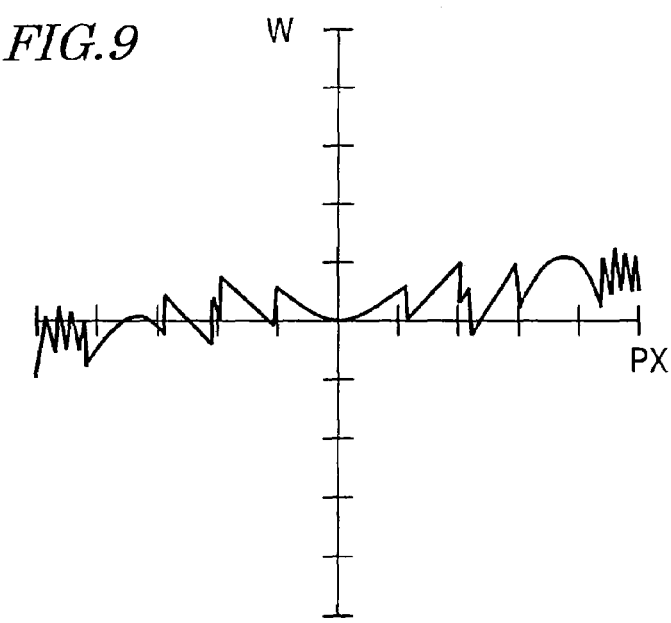
FIG. 9 shows a profile of coma in the optical head shown in FIG. 1.

FIG. 9 shows a distribution of aberration occurring due to the second light source in the case where the optical device 107 shown in FIG. 5 is used in such a manner that the optical device 107 is shifted from the optical axis of the converging lens 108. In this example, d1=0 mm, d2=0.11 mm, and D=15 µm. As shown in FIG. 9, the equiphase wave surface of the wave front is slightly tilted. However, upon a detailed analysis of the components of the phase difference, it was found that residual components of aberration are astigmatism components and higher-order aberration components, and that the coma which was $15 \times 10^{-3} \times \lambda 2$ has been reduced to substantially zero.

Thus, in accordance with the optical head of the present embodiment, an optical shift device for correcting the spherical aberration occurring due to a converging lens is disposed so as to be shifted from the optical axis of the converging lens, whereby both spherical aberration and coma can be simultaneously reduced. As a result, regardless of whether a first light source or a second light source is used, with respect to an optical recording medium for which recording and/or reproduction is to be performed with either light source, an optical head and an optical disk apparatus are realized which are capable of high-quality recording and/or reproduction by using light in a convergence state with suppressed or optimized aberrations.

Since it is unnecessary to use a separate aberration correction device for correcting coma in addition to the optical device 107, the number of parts composing the optical system can be reduced, whereby the production cost is reduced. By reducing the number of parts, adjustment of the optical system also becomes easy.

Figure 10:
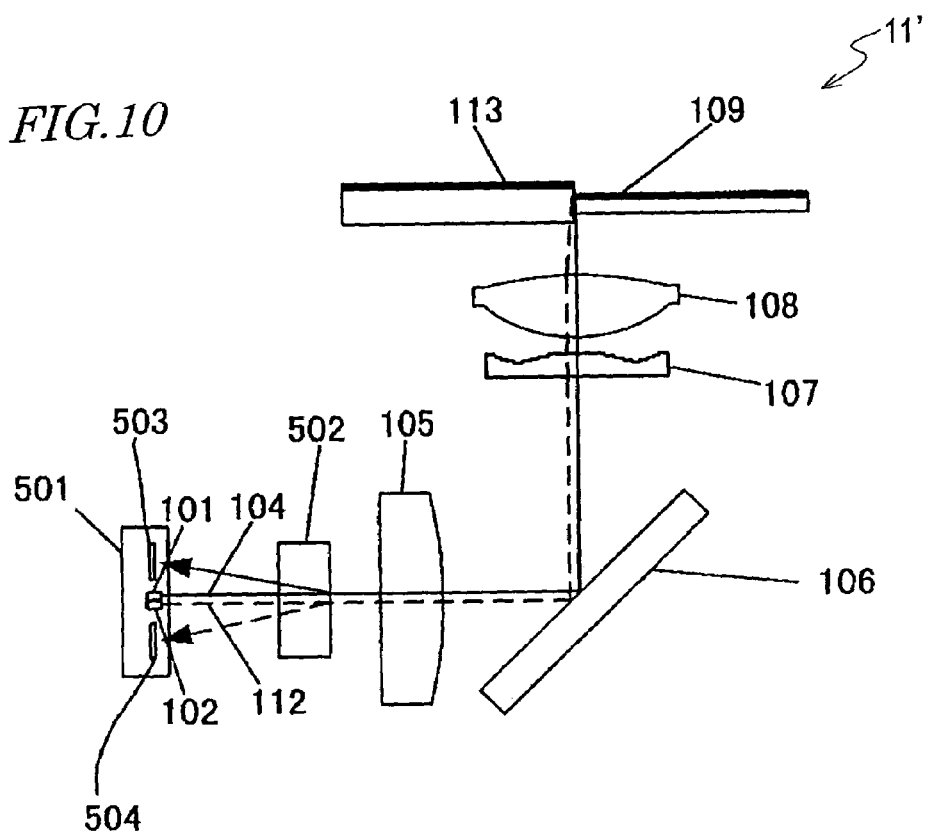
FIG. 10 is a schematic diagram showing a variant of the first embodiment.

In the optical head 11, the light source device 103 and the photodetector 111 are implemented as separate devices, and they are disposed at distant locations within the optical head 11. However, the light source device 103 and the photodetector 111 may be disposed adjacent to each other so as to compose a single device. An optical head 11' shown in FIG. 10 comprises a light source unit 501 which includes a first light source 101, a second light source 102, a photodetector 503, and a photodetector 504 within a single package. Moreover, an optical splitter device 502 for allowing light to enter the photodetector 503 and the photodetector 504 is further comprised. The optical splitter device 502 is composed of a diffraction grating for diffracting only light in a predetermined polarization state or the like.

Light 104 emitted from the first light source 101 is transmitted through the optical splitter device 502 and the collimating lens 105, and is caused to enter the optical device 107 via reflection by the mirror 106. The light having been transmitted through the optical device 107 is converged by the converging lens 108 toward the first optical recording medium 109. The light reflected by the first optical recording medium 109 follows an opposite optical path to reach the optical splitter device 502. The optical splitter device 502 diffracts the reflected light so that the reflected light will enter the photodetectors 503 and 504. The photodetectors 503 and 504 convert the incoming light into electrical signals.

Through a similar path, light 112 emitted from the second light source 102 is converged toward the second optical recording medium 113, and light reflected by the second optical recording medium 113 is led to the photodetectors 503 and 504.

The structures of the optical device 107 and the converging lens 108, and the positioning of the first light source 101, the second light source 102, the optical device 107, and the converging lens 108 are as described above.

Other than between the light source unit 501 and the collimating lens 105, the optical splitter device 502 may be disposed anywhere between the light source unit 501 and the converging lens 108.

In accordance with the optical head 11', in addition to the above-described effects of the optical head 11, the structure of the optical system can be simplified by using a light source unit which integrates detectors and light sources, thus making for cost reduction and small size of the optical head.

In the present embodiment, annular steps for causing aberration with respect to the second light source 102 are provided on the optical device 107. However, any steps or diffraction grooves for different purposes may be constructed in a region which lies outside the annular steps shown in FIG. 4 and FIG. 5 and which forms an optical path for the first light source 101. For example, in the case where the refractive index or shape of the converging lens 108 varies responsive to temperature changes to cause deterioration of the convergence performance, such may be used for the purpose of correcting the deterioration of convergence performance by utilizing wavelength fluctuations of the light source responsive to temperature changes. Moreover, such steps or diffraction grooves may be constructed integrally with the converging lens 108.

Second Embodiment

Figure 11:
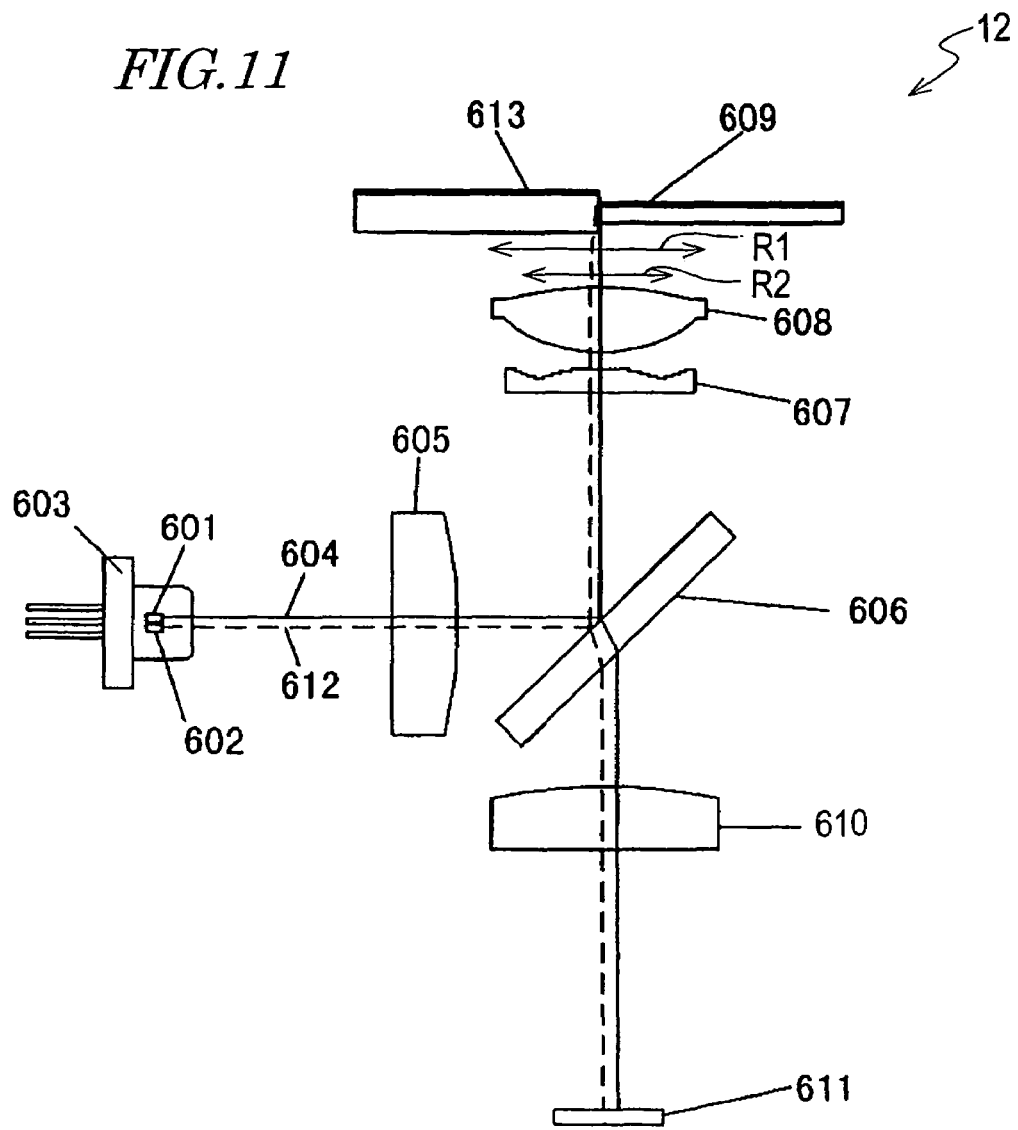
FIG. 11 is a diagram schematically showing the configuration of an optical head according to a second embodiment of the present invention.

FIG. 11 is diagram showing a second embodiment of an optical head according to the present invention. The optical head 12 shown in FIG. 11 is used for an optical disk apparatus which performs recording and/or reproduction of information for a first optical recording medium 609 and a second optical recording medium 613. As in the first embodiment, the optical head 12 comprises a first light source 601, a second light source 602, a converging lens 608, an optical device 607, a collimating lens 605, a mirror 606, a detection lens 610, and a detector 611. Moreover, as in the first embodiment, the first light source 601 and the second light source 602 are accommodated in a package, thus constituting a light source device 603.

On an optical path from the light source device 603 to the first optical recording medium 609 and the second optical recording medium 613, and on an optical path from the first optical recording medium 609 and the second optical recording medium 613 to the photodetector 611, these constituent elements are disposed in orders similar to those in the first embodiment.

The first light source 601 and the second light source 602 emit light of a first wavelength $\lambda 1$ and a second wavelength $\lambda 2$, respectively. The first wavelength $\lambda 1$ and the second wavelength $\lambda 2$ are different, such that the relationship $\lambda 1 < \lambda 2$ is satisfied. The first wavelength $\lambda 1$ and the second wavelength $\lambda 2$ are about 660 nm and about 790 nm, for example. The first light source 601 and the second light source 602 are used for recording and/or reproduction for the first optical recording medium 609 and the second optical recording medium 613, respectively. The substrates which are formed on the surfaces of the recording layers of the first optical recording medium 609 and the second optical recording medium 613 have thicknesses of t1 and t2 (t2≠t1), respectively.

In the first embodiment, the converging lens 108 (FIG. 1) is designed so that there is substantially zero spherical aberration with respect to light emitted from the first light source and the first optical recording medium 109. In the case of using a converging lens which is designed in such a manner, since spherical aberration with respect to one of the light sources is optimized, tolerance as to the alignment of the two light sources becomes one-sided, so that a high alignment precision may be required during production of the optical head, or the production yield may decrease.

In the present embodiment, by taking this point into consideration, the converging lens 608 is designed so that spherical aberration can be reduced to a certain extent with respect to either light source. Specifically, an optical recording medium having a substrate with a thickness t provided on the surface of whose recording layer and light of a wavelength λ are virtually contemplated, and the converging lens 608 is designed so that there is zero spherical aberration with respect to these virtual light and optical recording medium. Herein, t and λ satisfy t1<t<t2 and λ1<λ<λ2, respectively.

Moreover, as shown in FIG. 11, the converging lens 608 is constructed so as to converge light of the second wavelength with a numerical aperture NA2 in a region within a circle of a diameter R2 around its optical axis, and converge light of the first wavelength with a numerical aperture NA1 in a region within a circle of a diameter R1 (R1>R2). The beam radius of the light emitted from the first light source 601 and the beam radius of the light emitted from the second light source 602 are R1 and R2, respectively.

Figure 12:
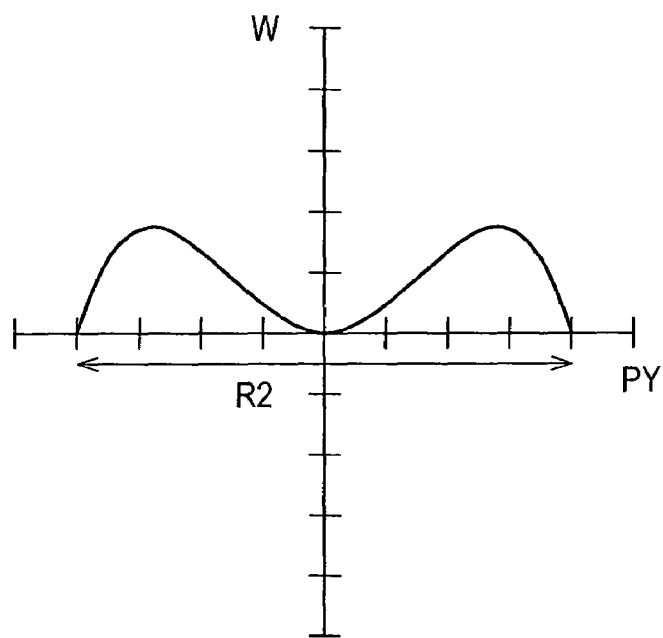
FIG. 12 each shows a profile of spherical aberration occurring for the second light source due to the converging lens of the optical head of FIG. 11 and the substrate of the second optical recording medium.
Figure 13:
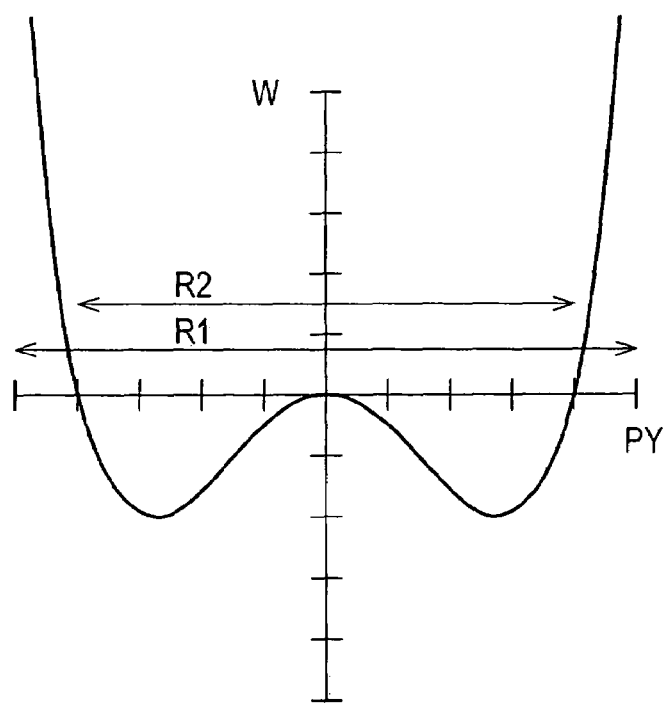
FIG. 13 each shows a profile of spherical aberration occurring for the first light source due to the converging lens of the optical head of FIG. 11 and the substrate of the first optical recording medium.

FIG. 12 and FIG. 13 show spherical aberrations in the cases where a light spot is formed on the recording layers of the second optical recording medium 613 and the first optical recording medium 609, respectively, by using the converging lens 608 as well as the second light source 602 and the first light source 601 thus designed. Although these figures only show aberration in a single cross-sectional direction, the spherical aberration will present a rotation symmetrical profile with respect to the optical axis, as mentioned above. Since the spherical aberration of the converging lens 608 is optimized with respect to the virtual light and optical recording medium having the intermediate wavelength of light and substrate thickness, aberrations occur in opposite directions in the region of the diameter R2, as shown in FIG. 12 and FIG. 13.

Figure 14:
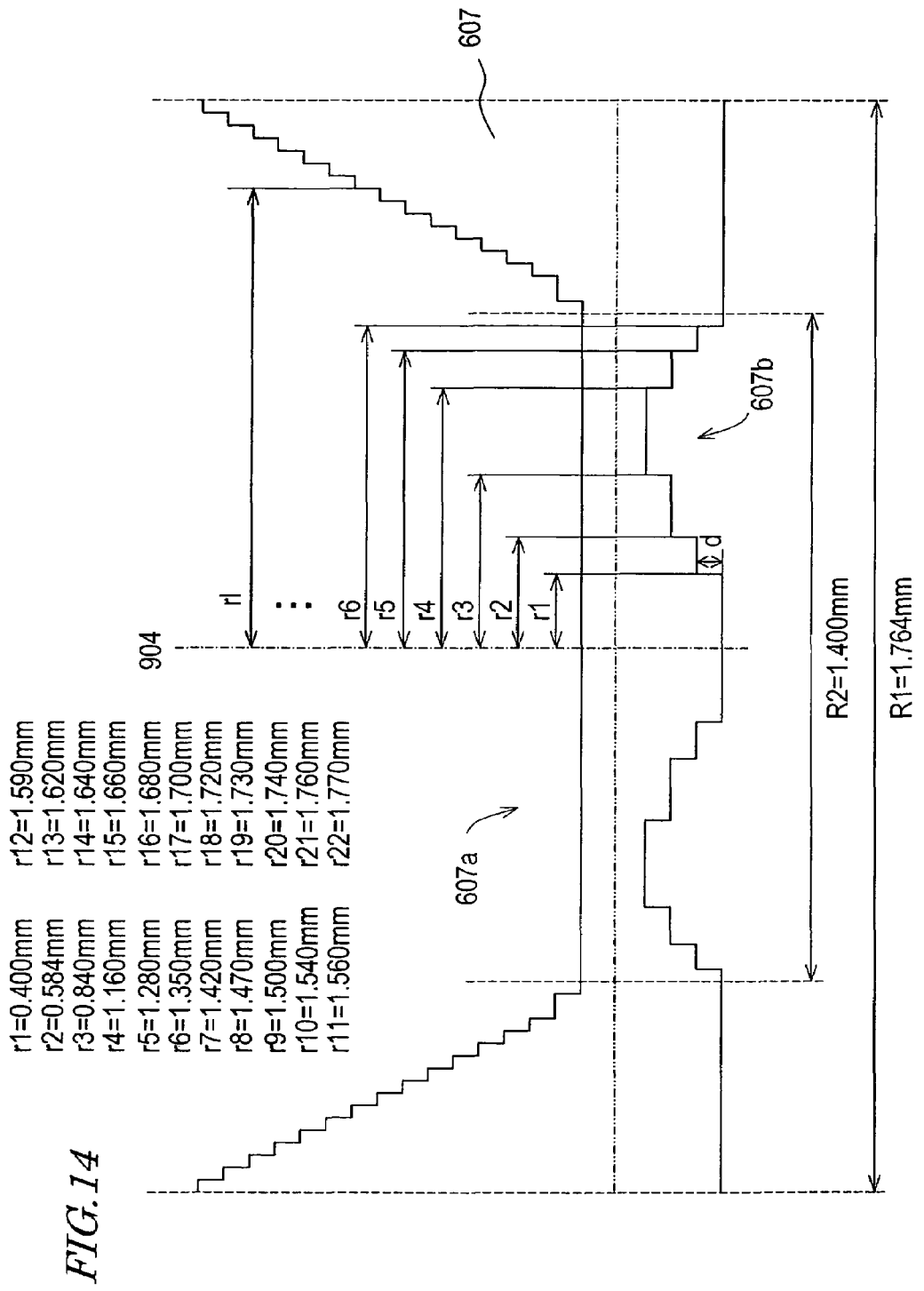
FIG. 14 shows a cross-sectional shape of an optical device for correcting a spherical aberration which occurs due to the converging lens of the optical head of FIG. 11 and the substrates of the first and second optical recording media.

FIG. 14 is a cross-sectional view showing an example of the optical device 607 for correcting the spherical aberration which occurs due to the converging lens 608. The optical device 607 has two parallel principal faces, and includes a plate structure which is transparent with respect to the first wavelength and the second wavelength. On the first principal face of the plate structure, a first aberration correction section 607a including a plurality of annular steps disposed in a concentric arrangement as shown in FIG. 4 is formed. The outermost ring has a diameter which is generally equal to the diameter of the light emitted from the second light source 102. On the second principal face, a second aberration correction section 607b including a plurality of annular steps disposed in a concentric arrangement is formed. The diameter of the outermost ring of the second aberration correction section 607b is equal to R2. The diameter of the outermost ring of the first aberration correction section 607a is equal to R1. The first aberration correction section 607a only allows light of the first wavelength emitted from the first light source 601 to be transmitted therethrough, whereas the second aberration correction section 607b allows light of the first wavelength emitted from the first light source 601 and light of the second wavelength emitted from the second light source 602 to be transmitted therethrough.

The annular steps form annular terraces interposed between steps. The depth of each annular step is equally prescribed to be d. In the present embodiment, d is prescribed so that a phase difference of +δ is imparted to the transmitted wave front of the light of the first wavelength λ1 and that a phase difference of −δ is imparted to the transmitted wave front of the light of the second wavelength λ2.

Figure 15:
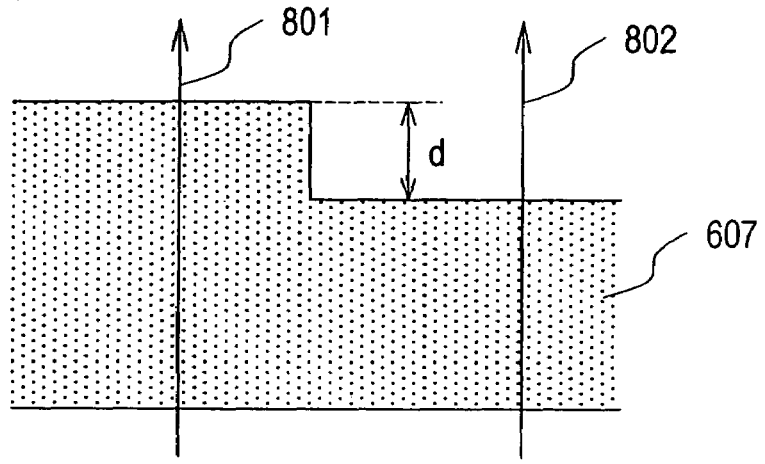
FIG. 15 shows an enlarged view of a portion of the structure shown in FIG. 14.

FIG. 15 is an enlarged cross-sectional view of a certain step portion. As shown in FIG. 15, the optical path difference between light 801 and 802 transmitted through two adjoining annular terraces is represented as (n1−1)d, where n1 is a refractive index of the optical device 607 with respect to the first wavelength λ1, and as (n2−1)d, where n2 is a refractive index of the optical device 607 with respect to the second wavelength λ2. Therefore, δ is determined by solving d=(i+δ)λ1/(n1−1)=(j−δ)λ2/(n2−1) (where i and j are integers), and δ={(n1−1)jλ2−(n2−1)iλ1}/{(n2−1)λ1+(n1−1)λ2}. The depth d is determined by determining δ.

By thus prescribing the depth d of the steps, a phase difference of +δ per step can be imparted to the wave front of the light of the first wavelength emitted from the first light source 601, and a phase difference of −δ per step can be imparted to the wave front of the light of the second wavelength emitted from the second light source 602

Thus, the second aberration correction section 607b which is formed within the circle of the diameter R2 as shown in FIG. 14 has a polarity which will impart a spherical aberration in the +direction, for example, to the light from the first light source 601, and a polarity which will impart a spherical aberration in the −direction to the light from the second light source 602. Therefore, the spherical aberrations within the circle of the diameter R2 of the converging lens 608 as shown in FIG. 12 and FIG. 13 can be cancelled out.

On the other hand, the first aberration correction section 607a which is formed in the region interposed between the circle of the diameter R2 and the circle of the diameter R1 has a polarity which will impart a spherical aberration in the −direction, for example, to the light from the first light source 601. As described above, this region is irradiated only with the light emitted from the first light source 601, and not with the light emitted from the second light source 602. Therefore, the spherical aberration occurring due to the light of the first wavelength in the region of the converging lens 608 interposed between the circle of the diameter R1 and the circle of the diameter R2 shown in FIG. 13 can be cancelled.

Note that the structure shown in FIG. 14 is an example in the case where: t=0.6 mm; λ1=0.66 μm; λ2=0.79 μm; NA1=0.63; NA2=0.50; refractive index (of the optical device 107) n1≈n2≈1.51; N=1; focal length of the converging lens is 2.8; and focal length of the collimating lens is 18.3. The optical device 107 can be produced by a known designing and production method for an optical device for correcting spherical aberration.

The optical device 607 having such a structure is shifted with respect to the optical axis of the converging lens 608 so as to mainly reduce the coma which occurs due to the light emitted from the second light source 602, as in the first embodiment. However, as shown in FIG. 13, the spherical aberration with respect to the light of the first wavelength drastically increases in the region of the converging lens 608 interposed between the circle of the diameter R1 and the circle of the diameter R2. Therefore, if the optical device 607 is shifted in order to reduce the coma occurring due to the second light source 602, the spherical aberration may not be appropriately reduced in this region. Therefore, the first aberration correction section 607a of the optical device 607 used for correcting the spherical aberration in this region is not shifted, but only the second aberration correction section 607b is shifted.

Figure 16:
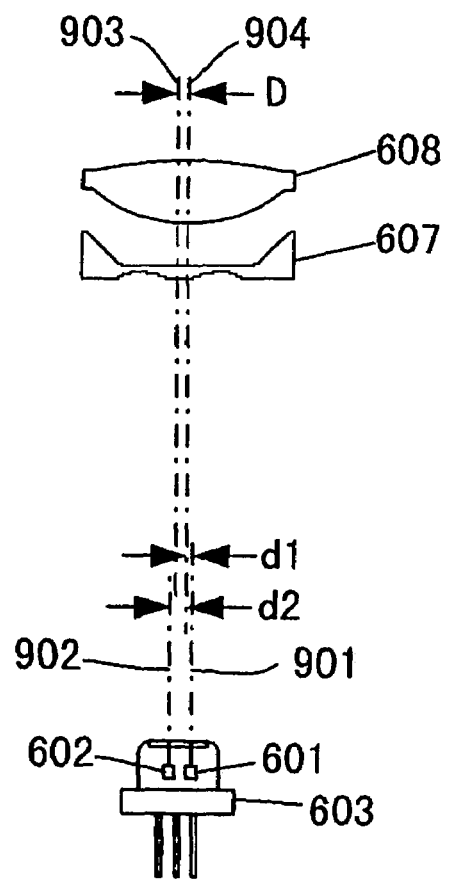
FIG. 16 is a diagram for explaining relative positioning of main constituent elements of the optical head of FIG. 11.
Figure 17:
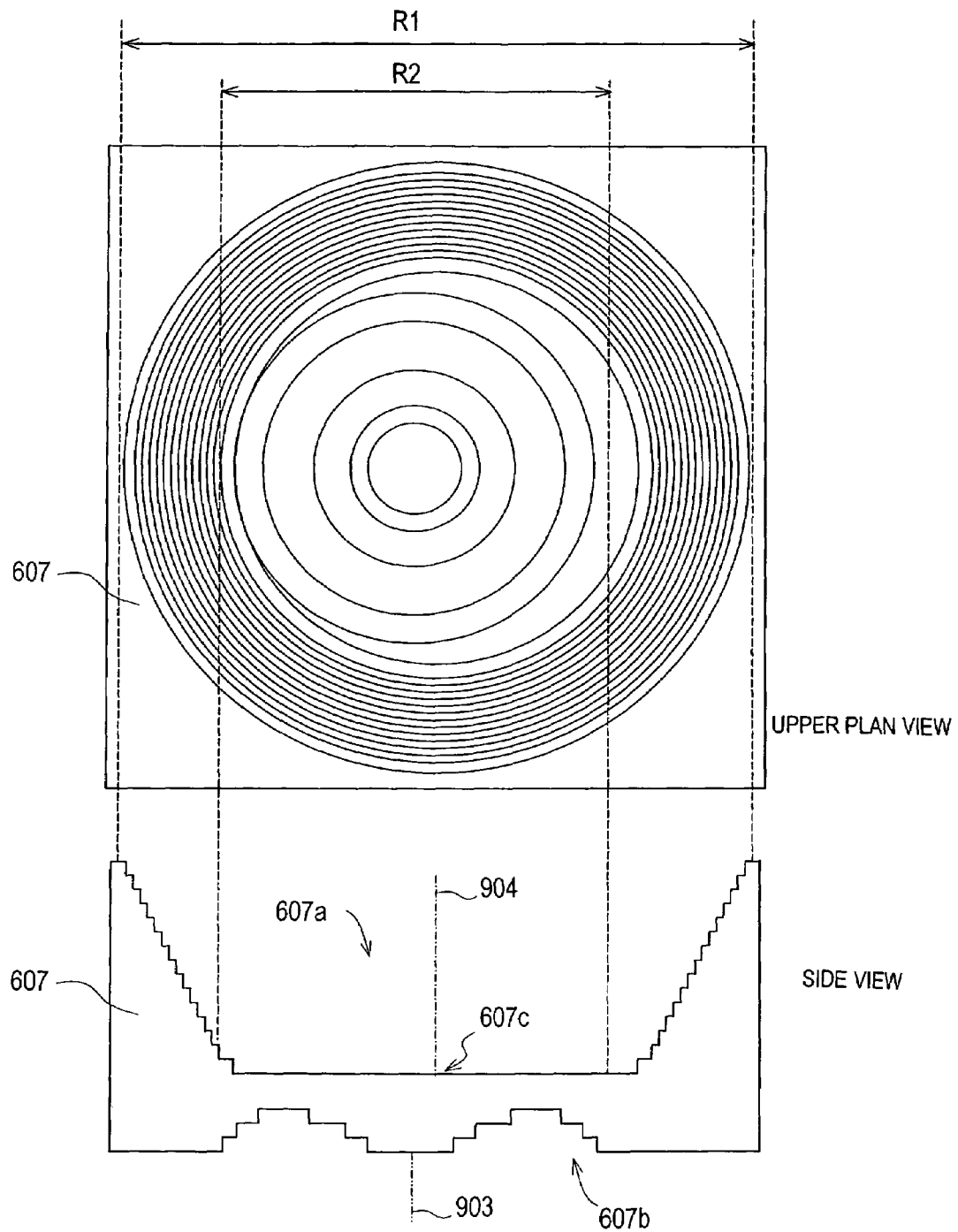
FIG. 17 shows the structure of an optical device to be used in the optical head of FIG. 11.

As shown in FIG. 16 and FIG. 17, the light source device 603 is positioned with respect to the converging lens 108 so as to satisfy d1<d2, where d1 is the distance between the optical axis 904 of the converging lens 608 and the optical axis 901 of the first light source 601 and d2 is the distance between the optical axis 904 of the converging lens 608 and the optical axis 902 of the second light source 602. Moreover, the optical axis 903 of the second aberration correction section 607b of the optical device 607 is shifted with respect to the optical axis 904 of the converging lens 608 by a distance D (where D<d2) toward the optical axis 902 of the second light source 602. It is ensured that the optical axis 607d of the first aberration correction section 607a of the optical device 607 coincides with the optical axis 904 of the converging lens 608.

Based on the relative positioning of the converging lens 608, the second aberration correction section 607b, the first light source 601, and the second light source 602, the values of the distances D, d1, and d2 are determined so that the phase difference (which occurs due to the second aberration correction section 607b) with respect to the light emitted from the second light source 602 lessens or cancels the coma which occurs due to the second light source 602 and the spherical aberration which occurs due to the converging lens 608. As described in the first embodiment, the distances D, d1, and d2 can be determined through simulations.

When light of the first wavelength is emitted from the first light source 601, in the region interposed between the circle of the diameter R1 and the circle of the diameter R2, the spherical aberration occurring due to the converging lens 608 is substantially completely cancelled by the first aberration correction section 607a because the optical axis 607c of the first aberration correction section 607a coincides with the optical axis 904 of the converging lens 608. In the region within the circle of the diameter R2, a phase difference which will correct the spherical aberration occurring due to the converging lens 608 is imparted to the light of the first wavelength by the second aberration correction section 607b, as described above. Therefore, the spherical aberration which occurs due to the converging lens 608 is cancelled or appropriately suppressed.

Since the first light source 601 is disposed so as to satisfy the relationship d1<d2 with respect to the optical axis of the converging lens 608, the shift between the first light source 601 and the optical axis of the converging lens 608 is small, so that the coma occurring due to the first light source 601 is also suppressed. Therefore, in a beam spot which is formed on the recording layer of the first optical recording medium 613, both spherical aberration and coma are suppressed.

On the other hand, when light of the second wavelength is emitted from the second light source 602, upon transmission through the second aberration correction section 607b, the transmitted wave front changes so as to cause a phase difference which will correct or compensate the spherical aberration occurring at the converging lens 608. By appropriately shifting the optical axis of the second light source 602 from the converging lens 608, it becomes possible to allow the light which has acquired a phase difference to enter the converging lens 608 in such a manner as to reduce coma. As a result, both spherical aberration and coma can be suppressed in the beam spot which is formed on the recording layer of the second optical recording medium 113.

In the case where the first aberration correction section 607a and the second aberration correction section 607b of the shapes shown in FIG. 17 are used, spherical aberration and coma can be made substantially zero with respect to the first light source 601 and the second light source 602 by prescribing d1=0, d2=0.11 mm, D=29 μm.

Thus, in accordance with the optical head of the present embodiment, as in the first embodiment, an aberration correction section of an optical shift device for correcting the spherical aberration occurring due to a converging lens is disposed so as to be shifted from the optical axis of the converging lens, whereby both spherical aberration and coma can be simultaneously reduced. As a result, regardless of whether a first light source or a second light source is used, with respect to an optical recording medium for which recording and/or reproduction is to be performed with either light source, an optical head and an optical disk apparatus are realized which are capable of high-quality recording and/or reproduction by using light in a convergence state with suppressed or optimized aberrations.

Moreover, in the present embodiment, the spherical aberration of the converging lens is optimized with respect to the virtual light and optical recording medium having an intermediate wavelength of light and substrate thickness between the first light source and the first optical recording medium and the second light source and the second optical recording medium. Therefore, the residual from the correction of the spherical aberration occurring by shifting the optical axes of the first light source and the second light source from the optical axis of the converging lens is dispersed with respect to the first light source and the second light source, and the range of tolerance with respect to the alignment precision of the components of the optical head can be broadened. As a result, the production of the optical head can be facilitated, and the production yield can be improved.

Figure 18:
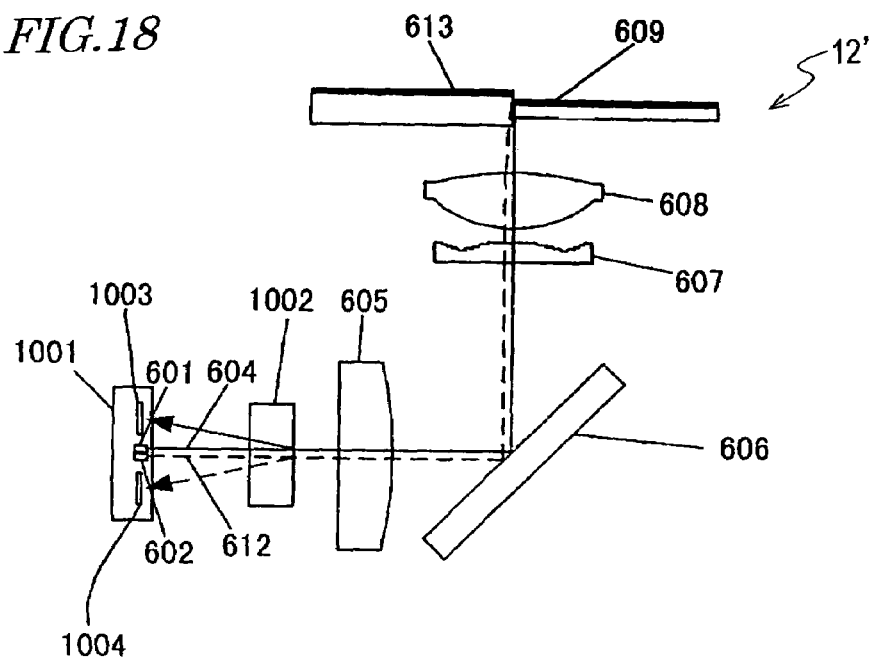
FIG. 18 is a schematic diagram showing a variant of the second embodiment.

As described in the first embodiment, the light source device 603 and the photodetector 611 may be disposed adjacent to each other so as to compose a single device in the present embodiment, too. An optical head 12' shown in FIG. 18 comprises a light source unit 1001 which includes a first light source 601, a second light source 602, a photodetector 1003, and a photodetector 1004 within a single package.

Light 604 emitted from the first light source 601 and light 612 emitted from the second light source 602 are transmitted through the optical splitter device 1002 and the collimating lens 605, and are caused to enter the optical device 607 via reflection by the mirror 606. The light having been transmitted through the optical device 607 is converged by the converging lens 608 toward the first optical recording medium 609. The light reflected by the first optical recording medium 609 follows an opposite optical path to reach the optical splitter device 1002. The optical splitter device 1002 diffracts the reflected light so that the reflected light will enter the photodetectors 1003 and 1004. The photodetectors 1003 and 1004 convert the incoming light into electrical signals.

Other than between the light source unit 1001 and the collimating lens 605, the optical splitter device 1002 may be disposed anywhere between the light source unit 1001 and the converging lens 608.

In accordance with the optical head 12', in addition to the above-described effects of the optical head 11, the structure of the optical system can be simplified by using a light source unit which integrates detectors and light sources, thus making for cost reduction and small size of the optical head.

Third Embodiment

Figure 19:
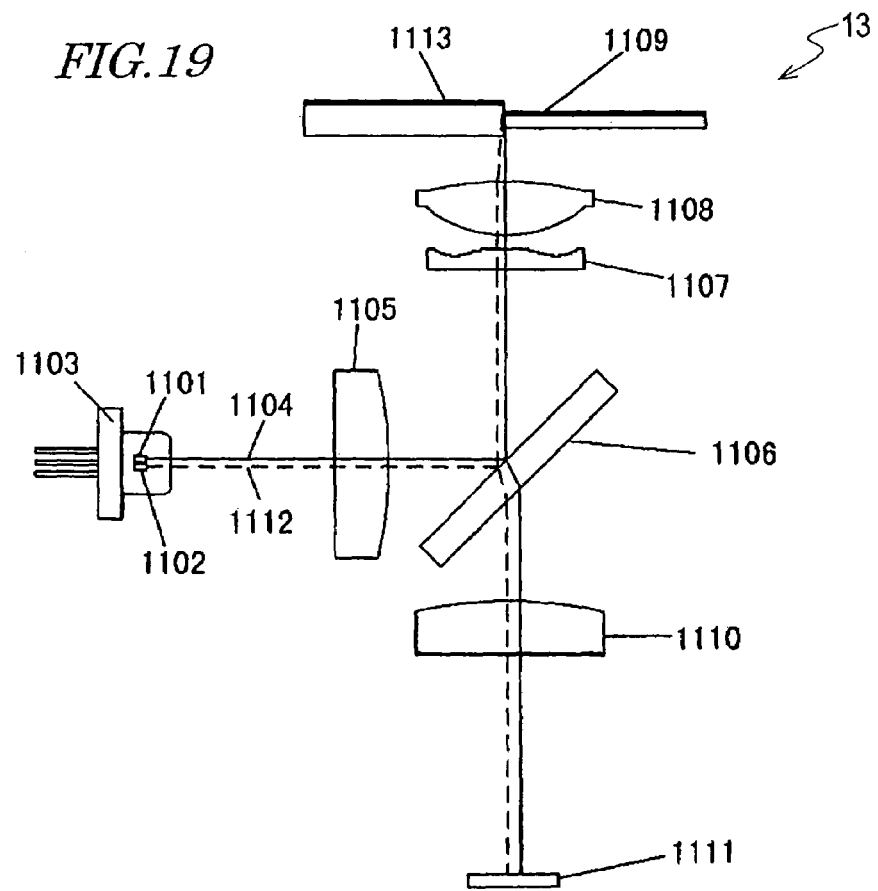
FIG. 19 is a diagram schematically showing the configuration of an optical head according to a third embodiment of the present invention.

FIG. 19 is diagram showing a third embodiment of an optical head according to the present invention. The optical head 13 shown in FIG. 19 is used for an optical disk apparatus which performs recording and/or reproduction of information for a first optical recording medium 1109 and a second optical recording medium 1113. As in the second embodiment, the optical head 13 comprises a first light source 1101, a second light source 1102, a converging lens 1108, an optical device 1107, a collimating lens 1105, a mirror 1106, a detection lens 1110, and a detector 1111. Moreover, as in the first embodiment, the first light source 1101 and the second light source 1102 are accommodated in a single package, thus constituting the light source device 1103.

On an optical path from the light source device 1103 to the first optical recording medium 1109 and the second optical recording medium 1113, and on an optical path from the first optical recording medium 1109 and the second optical recording medium 1113 to the photodetector 1111, these constituent elements are disposed in orders similar to those in the first embodiment.

The first light source 1101 and the second light source 1102 emit light of a first wavelength $\lambda 1$ and a second wavelength $\lambda 2$, respectively. The first wavelength $\lambda 1$ and the second wavelength $\lambda 2$ are different, such that the relationship $\lambda 1 < \lambda 2$ is satisfied. The first wavelength $\lambda 1$ and the second wavelength $\lambda 2$ are about 660 nm and about 790 nm, for example. The first light source 1101 and the second light source 1102 are used for recording and/or reproduction for the first optical recording medium 1109 and the second optical recording medium 1113, respectively. The substrates which are formed on the surfaces of the recording layers of the first optical recording medium 1109 and the second optical recording medium 1113 have thicknesses of t1 and t2 (t2≠t1), respectively.

Figure 20:
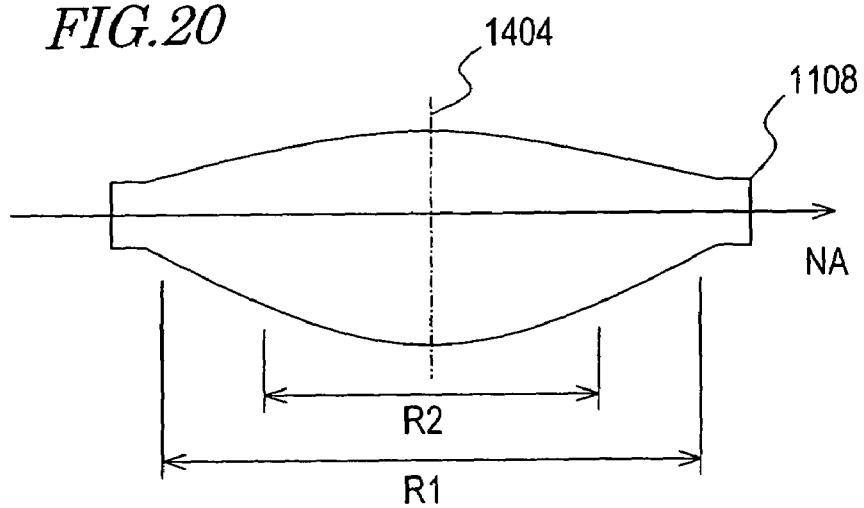
FIG. 20 is a cross-sectional view schematically showing the structure of a converging lens to be used in the optical head of FIG. 19.

As in the second embodiment, as shown in FIG. 20, the converging lens 1108 is constructed so as to converge light of the second wavelength with a numerical aperture NA2 in a region within a circle of a diameter R2 around its optical axis 1404, and converge light of the first wavelength with a numerical aperture NA1 in an annular region interposed by a circle of a diameter R1 (R1>R2). The beam radius of the light emitted from the first light source 1101 and the beam radius of the light emitted from the second light source 1102 are R1 and R2, respectively. Moreover, in the region within the circle of the diameter R2, an optical recording medium having a substrate with a thickness t provided on the surface of whose recording layer and light of a wavelength $\lambda$ are virtually contemplated, and the converging lens 1108 is designed so that there is zero spherical aberration with respect to these virtual light and optical recording medium.

On the other hand, in an annular region interposed between the circle of the diameter R2 and the circle of the diameter R1 (R1>R2), it is designed so that the spherical aberration of a beam spot which is formed on the recording layer of the first optical recording medium becomes optimum with respect to the light of the first wavelength emitted from the first light source 1101 and the first optical recording medium 1109.

The beam radius of the light emitted from the first light source 1101 and the beam radius of the light emitted from the second light source 1102 are R1 and R2, respectively.

Figure 21:
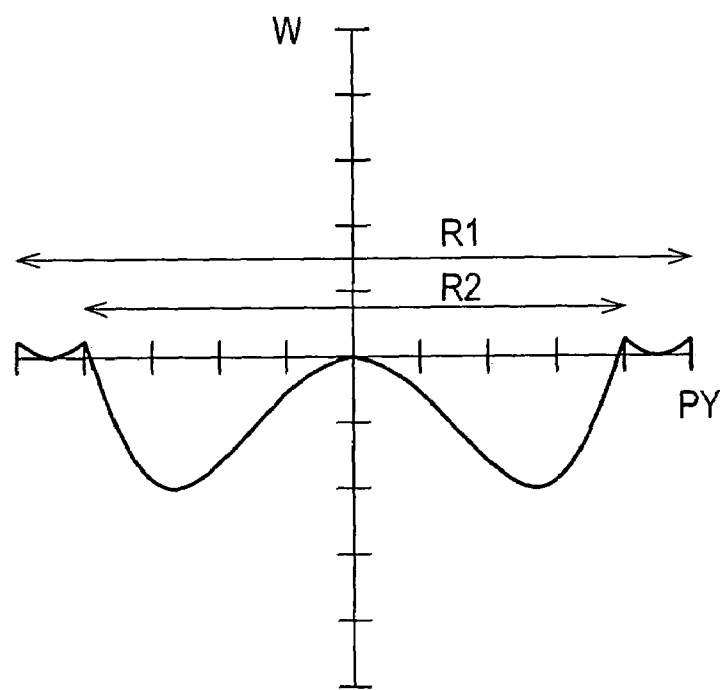
FIG. 21 shows a profile of spherical aberration occurring for the first light source due to the converging lens shown in FIG. 20 and the substrate of the first optical recording medium.

FIG. 21 shows spherical aberration in the case where a light spot is formed by the first light source 1101 on the recording layer of the first optical recording medium 1109, using the converging lens 1108 thus designed. In the region within the circle of the diameter R2, it is designed so that there is zero spherical aberration with respect to the virtual optical recording medium having a substrate thickness of t, and therefore a predetermined spherical aberration is occurring with respect to the light of the first wavelength emitted from the first light source 1101. On the other hand, in the annular region interposed between the circle of the diameter R2 and the circle of the diameter R1, it is designed so that there is zero spherical aberration with respect to the light of the first wavelength, and therefore there is substantially zero spherical aberration.

The spherical aberration which occurs when a light spot is formed on the recording layer of the second optical recording medium 1113 by the second light source 1102 is as shown in FIG. 12. As described in the second embodiment, in the region within the circle of the diameter R2, opposite spherical aberrations exist for the light of the first wavelength and for the light of the second wavelength.

As shown in FIG. 20, the converging lens 1108 of the present embodiment is designed so that there is zero spherical aberration with respect to the light of the first wavelength in the annular region interposed between the circle of the diameter R2 and the circle of the diameter R1. Therefore, the optical device 1107 for correcting the spherical aberration of the converging lens 1108 is identical to what is obtained by omitting, from the optical device 607 of the second embodiment, the first aberration correction section 607a used for correcting spherical aberration in this region.

FIG. 22 and FIG. 33 show an example of the optical device 1107 for correcting the spherical aberration which occurs due to the converging lens 1108. The optical device 1107 has two parallel principal faces, and includes a plate structure which is transparent with respect to the first wavelength and the second wavelength. On the first principal face of the plate structure, a structure including a plurality of annular steps disposed in a concentric arrangement, which corresponds to the second aberration correction section of the second embodiment, is formed. The diameter of the outermost ring is equal to R2.

The annular steps form annular terraces interposed between steps. The depth of each annular step is equally prescribed to be d.

Figure 24:
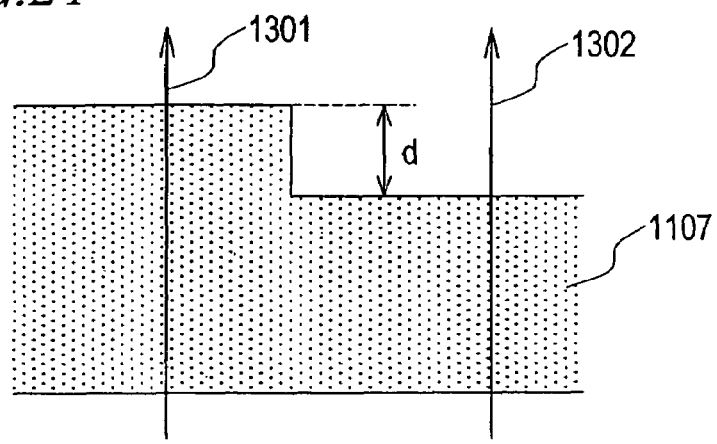
FIG. 24 shows a further enlarged view of a portion of the structure shown in FIG. 23.

FIG. 24 is an enlarged cross-sectional view of a certain step portion. As shown in FIG. 24, as in the second embodiment, the optical path difference d between light 1301 and 1302 transmitted through two adjoining annular terraces is prescribed so that a phase difference of $+\delta$ is imparted to the transmitted wave front of the light of the first wavelength $\lambda 1$ and that a phase difference of $-\delta$ is imparted to the transmitted wave front of the light of the second wavelength $\lambda 2$.

The structure shown in FIG. 23 is an example in the case where: t=0.9 mm; $\lambda 1$=0.66 μm; $\lambda 2$=0.79 μm; NA1=0.63; NA2=0.50; refractive index (of the optical device 107) n1≈n2≈1.51; N=1; focal length of the converging lens is 3.05; and focal length of the collimating lens is 20. Since the focal lengths of the converging lens and the collimating lens and the thickness of the substrate of the virtual optical recording medium are prescribed to different values from those in the example illustrated in the second embodiment, the dimensions of the components of the structure shown in FIG. 23 are different from the dimensions of the structure shown in FIG. 14.

The optical device 1107 shown in FIG. 22 and FIG. 23 has a polarity which will impart a spherical aberration in the +direction, for example, to the light from the first light source 1101, and a polarity which will impart a spherical aberration in the −direction to the light from the second light source 1102. Therefore, the spherical aberrations within the circle of the diameter R2 of the converging lens 608 as shown in FIG. 21 can be cancelled out. Moreover, as described above, the converging lens 1108 is designed so that there is zero spherical aberration with respect to the light of the first wavelength in the annular region interposed between the circle of the diameter R2 and the circle of the diameter R1. For this reason, no steps are formed in this region of the optical device 1107, but occurrence of spherical aberration is already suppressed.

Figure 25:
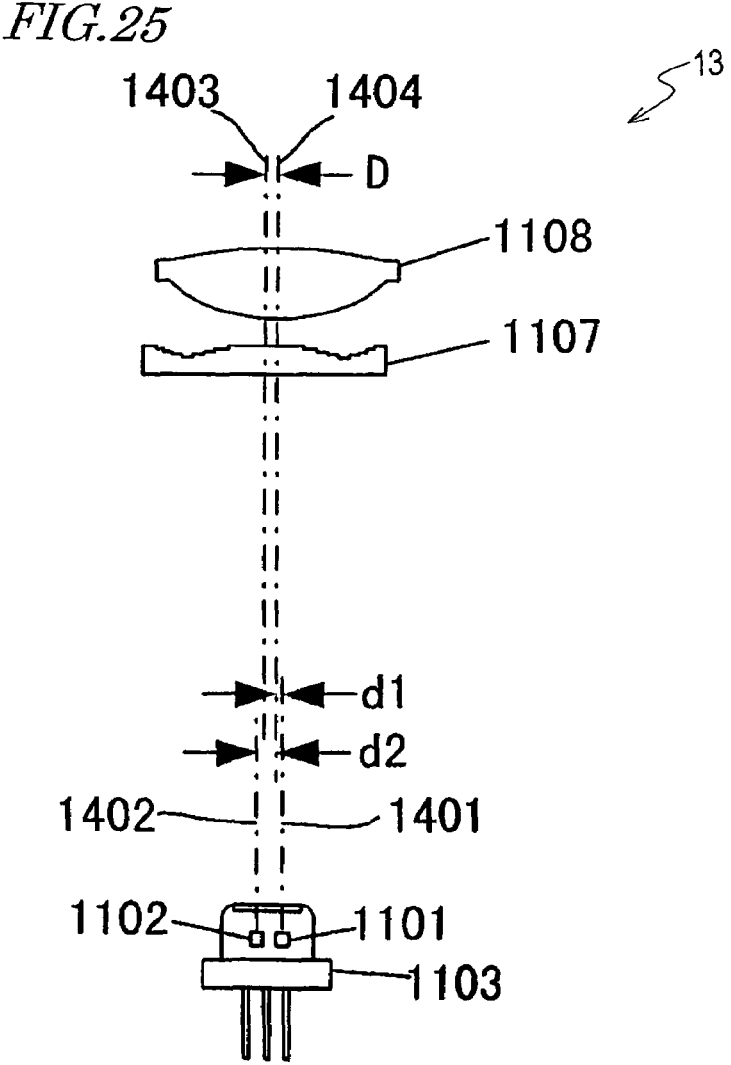
FIG. 25 is a diagram for explaining relative positioning of main constituent elements of the optical head of FIG. 19.

The optical device 1107 having such a structure is shifted with respect to the optical axis of the converging lens 1108 so as to mainly reduce the coma which occurs due to the light emitted from the second light source 1102, as in the second embodiment. As shown in FIG. 25, the light source device 1107 is positioned with respect to the converging lens 1108 so as to satisfy d1<d2, where d1 is the distance between the optical axis 1404 of the converging lens 1108 and the optical axis 1101 of the first light source 1101 and d2 is the distance between the optical axis 1404 of the converging lens 1108 and the optical axis 1402 of the second light source 1102. Moreover, the optical axis 1403 of the optical device 1107 is shifted with respect to the optical axis 1404 of the converging lens 1108 by a distance D (where D<d2) toward the optical axis 1402 of the second light source 1102.

Based on the relative positioning of the converging lens 1108, the optical device 1107, the first light source 1101, and the second light source 1102, the values of the distances D, d1, and d2 are determined, through simulations, so that the phase difference (which occurs due to the optical device 1107) with respect to the light emitted from the second light source 1102 lessens or cancels the coma which occurs due to the second light source 1102 and the spherical aberration which occurs due to the converging lens 1108.

When light of the first wavelength is emitted from the first light source 1101, since no steps for changing the wave front of light are provided in the region of the optical device 1107 interposed between the circle of the diameter R1 and the circle of the diameter R2, there is no change in the phase of the light of the first wavelength transmitted through this region. Moreover, no spherical aberration occurs in the region of the converging lens 1108 interposed between the circle of the diameter R1 and the circle of the diameter R2 because spherical aberration is optimized with respect to the light of the first wavelength.

In the region within the circle of the diameter R2, a phase difference which will correct the spherical aberration occurring due to the converging lens 1108 is imparted to the light of the first wavelength by the optical device 1107, as described above. Therefore, the spherical aberration which occurs due to the converging lens 1108 is cancelled or appropriately suppressed.

Since the first light source 1101 is disposed so as to satisfy the relationship d1<d2 with respect to the optical axis of the converging lens 1108, the shift between the first light source 1101 and the optical axis of the converging lens 1108 is small, so that the coma occurring due to the first light source 1101 is also suppressed. Therefore, in a beam spot which is formed on the recording layer of the first optical recording medium 1109, both spherical aberration and coma are suppressed.

On the other hand, when light of the second wavelength emitted from the second light source 1102 is transmitted through the optical device 1107, the transmitted wave front changes so as to cause a phase difference which will correct or compensate the spherical aberration occurring at the converging lens 1108. By appropriately shifting the optical axis of the optical device 1107 from the converging lens 1108, it becomes possible to allow the light which has acquired a phase difference to enter the converging lens 1108 in such a manner as to reduce coma. As a result, both spherical aberration and coma can be suppressed in the beam spot which is formed on the recording layer of the second optical recording medium 1113.

In the case where the optical device 1107 of the structure shown in FIG. 23 is used, spherical aberration and coma can be made substantially zero with respect to the first light source 1101 and the second light source 1102 by prescribing d1=0, d2=0.11 mm, D=29 μm.

Thus, in accordance with the optical head of the present embodiment, as in the first and second embodiments, an aberration correction section of an optical shift device for correcting the spherical aberration occurring due to a converging lens is disposed so as to be shifted from the optical axis of the converging lens, whereby both spherical aberration and coma can be simultaneously reduced. As a result, regardless of whether a first light source or a second light source is used, with respect to an optical recording medium for which recording and/or reproduction is to be performed with either light source, an optical head and an optical disk apparatus are realized which are capable of high-quality recording and/or reproduction by using light in a convergence state with suppressed or optimized aberrations.

In the present embodiment, as in the second embodiment, the spherical aberration of the converging lens is optimized with respect to the virtual light and optical recording medium having an intermediate wavelength of light and substrate thickness between the first light source and the first optical recording medium and the second light source and the second optical recording medium. Therefore, the residual from the correction of the spherical aberration occurring by shifting the optical axes of the first light source and the second light source from the optical axis of the converging lens is dispersed with respect to the first light source and the second light source, and the range of tolerance with respect to the alignment precision of the components of the optical head can be broadened. As a result, the production of the optical head can be facilitated, and the production yield can be improved.

Figure 26:
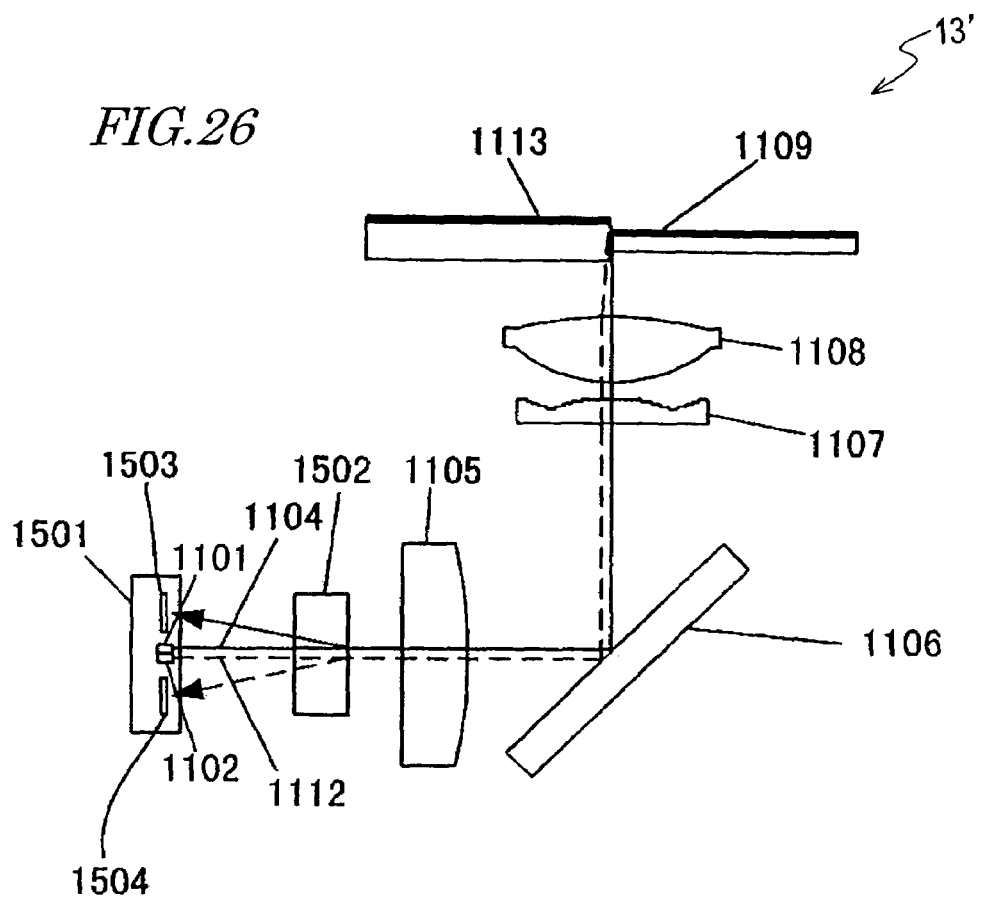
FIG. 26 is a schematic diagram showing a variant of the third embodiment.
Figure 27:
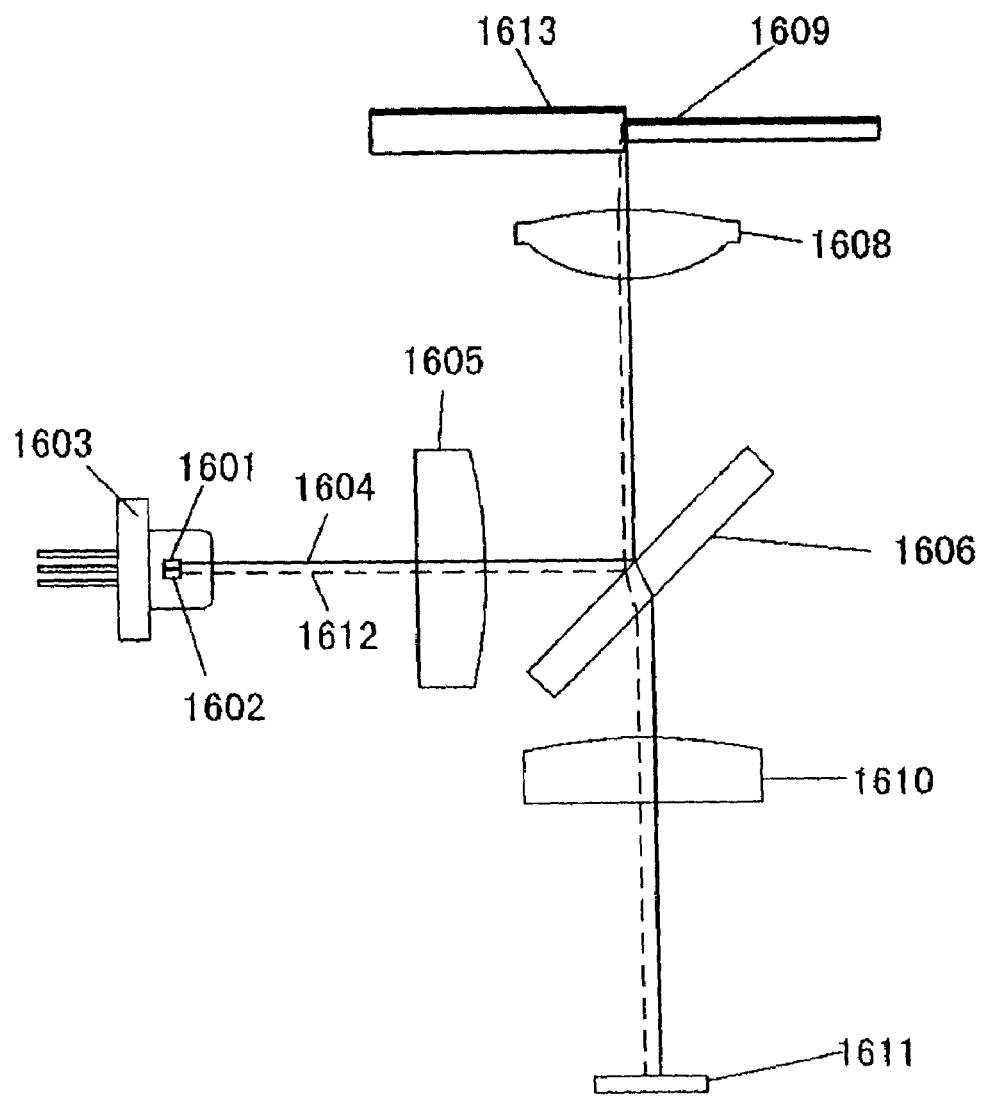
FIG. 27 is a diagram schematically showing the configuration of a conventional optical head.

As described in the first and second embodiments, the light source device 1103 and the photodetector 1111 may be disposed adjacent to each other so as to compose a single device in the present embodiment, too. An optical head 13' shown in FIG. 26 comprises a first light source 1101, a second light source 1102, a photodetector 1503, and a photodetector 1504 within a single package.

Light 1104 emitted from the first light source 1101 and light 1112 emitted from the second light source 1102 are transmitted through the optical splitter device 1502 and the collimating lens 1105, and are caused to enter the optical device 1107 via reflection by the mirror 1106. The light having been transmitted through the optical device 1107 is converged by the converging lens 1108 toward the first optical recording medium 1109 or the second optical recording medium 1113. The light reflected by the first optical recording medium 1109 or the second optical recording medium 1113 follows an opposite optical path to reach the optical splitter device 1502. The optical splitter device 1502 diffracts the reflected light so that the reflected light will enter the photodetectors 1503 and 1504. The photodetectors 1503 and 1504 convert the incoming light into electrical signals.

Other than between the light source unit 1501 and the collimating lens 1105, the optical splitter device 1105 may be disposed anywhere between the light source unit 1501 and the converging lens 1108.

In accordance with the optical head 13', in addition to the above-described effects of the optical head 13, the structure of the optical system can be simplified by using a light source unit which integrates detectors and light sources, thus making for cost reduction and small size of the optical head.

The optical head of the present invention admits of various modifications from the first to third embodiments. In the first to third embodiments, the converging lens and the optical device are constructed as separate parts, and the optical axis of the optical device is disposed so as to be shifted with respect to the optical axis of the converging lens on the optical path, as has been described in each embodiment. However, the converging lens and the optical device may be integrally constructed as a single part such that the optical axis of the optical device is shifted with respect to the optical axis of the converging lens. By doing so, alignment of the optical device with respect to the converging lens becomes unnecessary, whereby the production of the optical head is more facilitated.

Moreover, in the first to third embodiments above, a plurality of concentric steps are provided in the optical device for changing the wave front of the transmitted light, thus creating an optical path difference. However, similar effects can also be obtained by constructing the optical device of each embodiment by using a wave front conversion device which utilizes known light refraction effects, e.g., liquid crystal.

The optical heads described in the first to third embodiments can be suitably used in any known optical disk apparatus for recording information on an optical recording medium or reproducing information recorded on an optical recording medium. As described in each embodiment, the outer figure of the optical head of the present invention can be made small. Therefore, according to the present invention, inexpensive and small optical disk apparatuses can be realized, especially optical disk apparatuses for mobile use or the like.

Although the first to third embodiments each illustrate an optical head incorporating light sources for CDs and DVDs, the optical head may incorporate light sources for emitting light of any other wavelength. For example, a light source to be used for a next-generation optical recording medium for which recording/reproduction is performed by using light of a wavelength about 400 nm wavelength may be used as one of the light sources according to the present invention. Moreover, other than an optical disk apparatus, the optical head the present invention may be applied to various optical apparatuses of a structure such that two or more light sources and an optical convergence device such as an objective lens are comprised and a light beam is converged at a predetermined position.

INDUSTRIAL APPLICABILITY

The present invention provides an optical head which includes a plurality of light sources and is capable of forming a light beam spot with little aberration. This optical head can be suitably used for various optical apparatuses, in particular to optical disk apparatuses for recording information on an optical recording medium by using light or reproducing information recorded on an optical recording medium.

The invention claimed is:

1. An optical head for use in an optical disk apparatus which performs recording and/or reproduction of information for first and second optical recording media by using, respectively, light of a first wavelength and light of a second wavelength which is different from the first wavelength, comprising:
   a first light source for emitting light of the first wavelength;
   a second light source for emitting light of the second wavelength which is different from the first wavelength, the second light source being disposed adjacent to the first light source;
   a converging lens for converging the light emitted from the first and second light sources toward the first and second optical recording media; and
   an optical device disposed between: the first and second light sources; and the converging lens, the optical device reducing a spherical aberration which occurs due to a combination of: at least one of the light of the first wavelength and light of the second wavelength; at least corresponding one of the first and second optical recording media; and the converging lens,
   wherein an optical axis of the optical device is shifted with respect to an optical axis of the converging lens so as to reduce a coma which occurs due to an optical axis of at least one of the light of the first wavelength and light of the second wavelength not coinciding with the optical axis of the converging lens;
   the first and second optical recording media include a recording layer on which to form recording marks, and a substrate provided on a surface of the recording layer;
   the converging lens is structured to optimize the spherical aberration with respect to an optical recording medium whose substrate has a thickness t (where t satisfies the relationship $t1<t<t2$), wherein $t1$ and $t2$ are thicknesses of the substrates of the first and second optical recording media; and
   the optical device reduces the spherical aberration which occurs due to the converging lens and the substrates of the first and second optical recording media with respect to the light of the first wavelength and light of the second wavelength by changing transmitted wave fronts of the light of the first wavelength and light of the second wavelength.

2. The optical head of claim 1, wherein, the optical device includes a first aberration correction section provided in a region through which only the light of the first wavelength is transmitted and a second aberration correction section provided in a region through which the light of the first wavelength and the light of the second wavelength are transmitted; the optical axis of the optical device coincides with an optical axis of the second aberration correction section; and an optical axis of the first aberration correction section coincides with the optical axis of the converging lens.

3. The optical head of claim 2, wherein the first aberration correction section and the second aberration correction section of the optical device each have a rotation symmetrical structure with respect to the optical axis thereof.

4. The optical head of claim 3, wherein the first aberration correction section and the second aberration correction section of the optical device each include a plurality of annular steps disposed in a concentric arrangement around the corresponding optical axis.

5. The optical head of claim 4, wherein the first and second light sources are accommodated in a single package.

6. The optical head of claim 5, further comprising a photodetector for detecting reflected light which occurs due to the light emitted from the first and second light sources being reflected at the first and second optical recording media, wherein the detectors are disposed within the package.

7. The optical head of claim 1, wherein,
   the converging lens is structured so as to converge the light of the first wavelength with a numerical aperture NA2 in a region within a circle of a diameter R2 centered around the optical axis thereof, and converge the light of the first wavelength with a numerical aperture NA1 (where NA1<NA2) in a region within a circle of a diameter R1 (where R2<R1) centered around the optical axis;
   the region of the converging lens within the circle of the diameter R2 is structured so as to optimize the spherical aberration with respect to the optical recording medium whose substrate has the thickness t (where t satisfies the relationship $t1<t<t2$); and
   a region of the converging lens interposed between the circle of the diameter R1 and the circle of the diameter R2 is structured so as to optimize the spherical aberration with respect to the first optical recording medium.

8. The optical head of claim 1, wherein the optical axis of the optical device is shifted with respect to the optical axis of the converging lens, toward the optical axis of the light emitted from the second light source.

9. The optical head of claim 8, wherein the relationship d1<d2 is satisfied, where d1 and d2 are, respectively, a distance between the optical axis of the converging lens and the optical axis of the light emitted from the first light source and a distance between the optical axis of the converging lens and the optical axis of the light emitted from the second light source.

10. The optical head of claim 1, wherein the optical device has a rotation symmetrical structure with respect to the optical axis.

11. The optical head of claim 10, wherein the optical device includes a plurality of annular steps disposed in a concentric arrangement around the optical axis.

12. The optical head of claim 1, wherein the converging lens and the optical device are integrally formed.

13. An optical disk apparatus comprising the optical head defined in claim 1.

14. A beam spot formation method for forming first and second light beam spots on first and second optical recording media, by converging light respectively emitted from adjoining first and second light sources with a single converging lens, the first and second optical recording media including a recording layer on which to form recording marks, and a substrate provided on a surface of the recording layer, comprising:

disposing an optical device for correcting a spherical aberration which occurs in at least one of the first and second light beam spots due to the converging lens and the first and second optical recording media between: the first and second light sources; and the converging lens, and shifting an optical axis of the optical device with respect to an optical axis of the converging lens so as to reduce a coma which occurs due to optical axes of the first and second light sources not coinciding with the optical axis of the converging lens; and structuring the converging lens to optimize the spherical aberration with respect to an optical recording medium whose substrate has a thickness t (where t satisfies the relationship t1<t<t2), wherein t1 and t2 are thicknesses of the substrates of the first and second optical recording media;

wherein the optical device reduces the spherical aberration which occurs due to the converging lens and the substrates of the first and second optical recording media with respect to the light of the first wavelength and light of the second wavelength by changing transmitted wave fronts of the light of the first wavelength and light of the second wavelength.

* * * * *